United States Patent
Duan et al.

(10) Patent No.: US 8,270,289 B2
(45) Date of Patent: Sep. 18, 2012

(54) METHODS AND APPARATUS FOR SYSTEM FRAMING SYNCHRONIZATION CONTROL FOR A FRAMER/MAPPER/MULTIPLEXOR DEVICE WITH 1+1 AND EQUIPMENT PROTECTION

(75) Inventors: Cheng Gang Duan, Shanghai (CN); Lin Hua, Shanghai (CN); Michael S. Shaffer, Lynnfield, MA (US); Tao Wang, Shanghai (CN); Qian G. Xu, Shanghai (CN)

(73) Assignee: LSI Corporation, Milpitas, CA (US)

( * ) Notice: Subject to any disclaimer, the term of this patent is extended or adjusted under 35 U.S.C. 154(b) by 230 days.

(21) Appl. No.: 12/394,270

(22) Filed: Feb. 27, 2009

(65) Prior Publication Data
US 2010/0221001 A1 Sep. 2, 2010

(51) Int. Cl.
*G01R 31/08* (2006.01)
(52) U.S. Cl. ...................................................... 370/217
(58) Field of Classification Search .................. 370/203, 370/208, 215–228, 241–253, 277, 298, 304, 370/311, 312, 324, 328, 329, 334–338, 342–346, 370/349, 350, 379, 389, 392, 395.62, 445, 370/447, 458–470, 503, 507–520
See application file for complete search history.

(56) References Cited

U.S. PATENT DOCUMENTS

| | | | | |
|---|---|---|---|---|
| 5,872,780 A * | 2/1999 | Demiray et al. | ............ | 370/359 |
| 6,426,941 B1 * | 7/2002 | Vaman et al. | ............ | 370/228 |
| 6,633,537 B1 * | 10/2003 | Shimizu | ............ | 370/216 |
| 6,754,172 B1 * | 6/2004 | Tanaka et al. | ............ | 370/217 |
| 7,145,920 B2 * | 12/2006 | Kinoshita et al. | ............ | 370/503 |
| 7,792,132 B2 * | 9/2010 | Chen et al. | ............ | 370/419 |
| 2002/0118668 A1 * | 8/2002 | Sawey et al. | ............ | 370/350 |
| 2010/0221001 A1 * | 9/2010 | Duan et al. | ............ | 398/45 |

* cited by examiner

*Primary Examiner* — Kwang B Yao
*Assistant Examiner* — Jung-Jen Liu
(74) *Attorney, Agent, or Firm* — Ryan, Mason & Lewis, LLP

(57) ABSTRACT

Methods and apparatus are provided for framing synchronization control for a framer/mapper/multiplexor (FMM) device with 1+1 and equipment protection. FMM device are disclosed that synchronize one or more internal signals by changing a phase of the one or more internal signals without changing a frequency of the one or more internal signals based on a desired phase at a destination of each of the one or more internal signals. A programmable synchronization signal may optionally be employed for the synchronization.

15 Claims, 26 Drawing Sheets

FIG. 1
(PRIOR ART)

| SONET OPTICAL CARRIER LAVEL | SONET FRAME FORMAT | SDH LEVEL AND FRAME FORMAT | PAYLOAD BANDWIDTH (kbit/s) | LINE RATE (kbit/s) |
|---|---|---|---|---|
| OC-1 | STS-1 | STM-0 | 48,960 | 51,840 |
| OC-3 | STS-3 | STM-1 | 150,336 | 155,520 |
| OC-12 | STS-12 | STM-4 | 601,344 | 622,080 |
| OC-24 | STS-24 | STM-8 | 1,202,688 | 1,244,160 |
| OC-48 | STS-48 | STM-16 | 2,405,376 | 2,488,320 |
| OC-96 | STS-96 | STM-32 | 4,810,752 | 4,976,640 |
| OC-192 | STS-192 | STM-64 | 9,621,504 | 9,953,280 |
| OC-768 | STS-768 | STM-256 | 38,486,016 | 39,813,120 |
| OC-1536 | STS-1536 | STM-512 | 76,972,032 | 79,626,120 |
| OC-3072 | STS-3072 | STM-1024 | 153,944,064 | 159,252,240 |

ATCA Tx FRAME CONTROL-1299

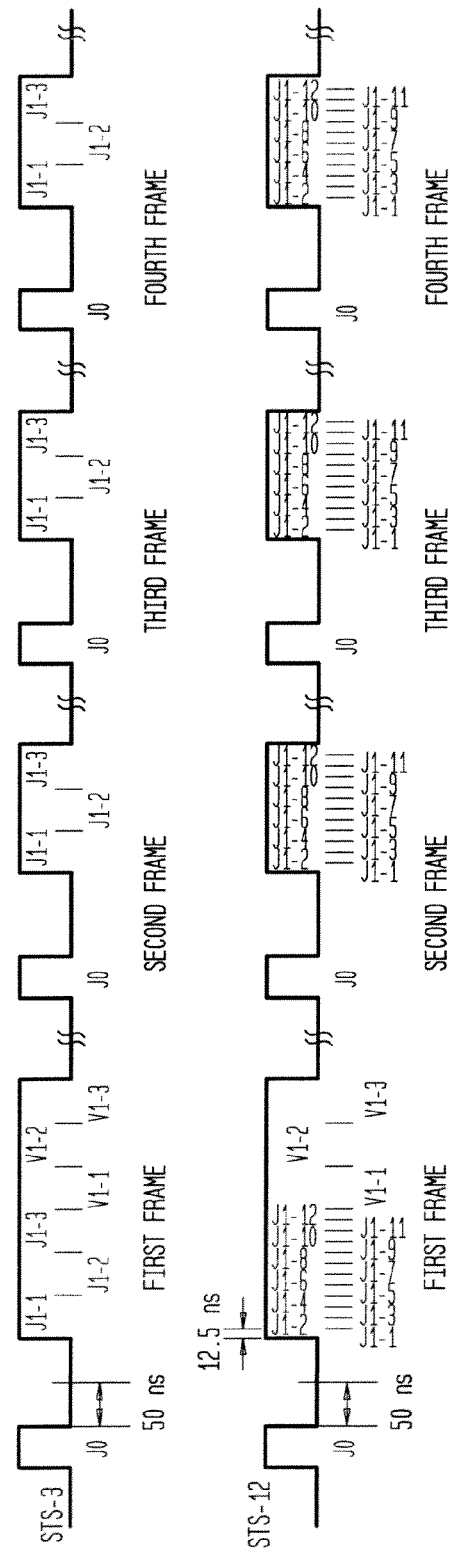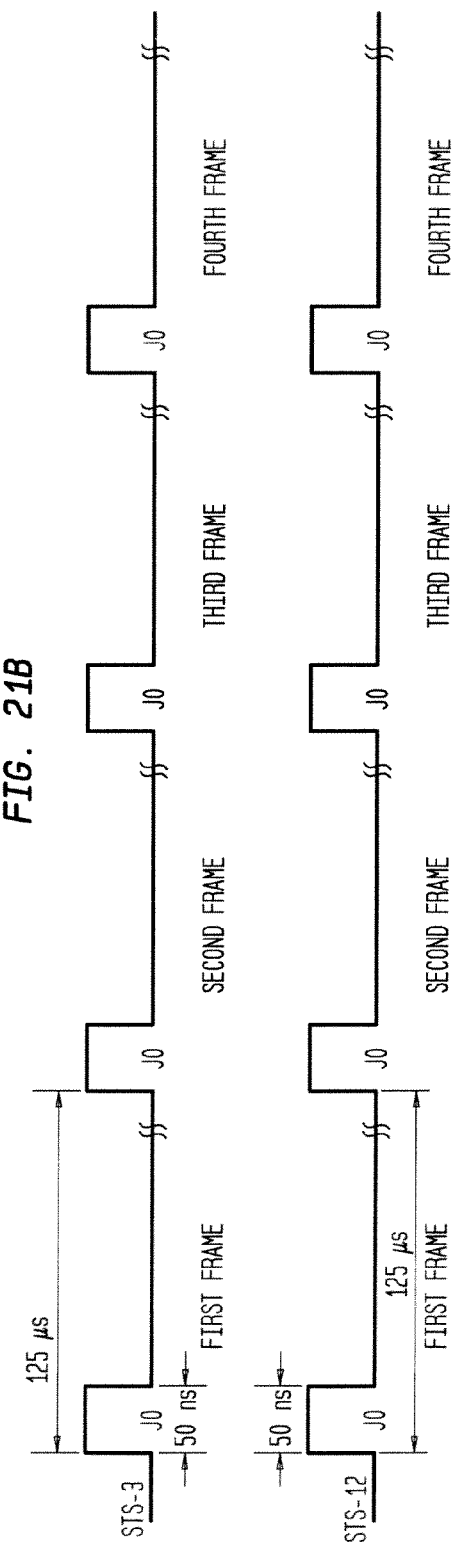

METHODS AND APPARATUS FOR SYSTEM FRAMING SYNCHRONIZATION CONTROL FOR A FRAMER/MAPPER/MULTIPLEXOR DEVICE WITH 1+1 AND EQUIPMENT PROTECTION

CROSS-REFERENCE TO RELATED APPLICATIONS

This application is related to U.S. patent application Ser. No. 12/331,807, entitled "Framer/Mapper/Multiplexor Device With 1+1 and Equipment Protection," incorporated by reference herein.

BACKGROUND OF THE INVENTION

1. Field of the Invention

The invention relates to electronic/optical communications, namely, the processing of SONET/SDH signals.

2. Description of the Related Art

A framer/mapper/multiplexor (FMM) device is an integrated communications device that converts one or more incoming signals into one or more outgoing signals. For example, an FMM device may convert two or more incoming low-speed signals into a corresponding outgoing high-speed signal. In addition or alternatively, an FMM device may convert an incoming high-speed signal into two or more corresponding outgoing low-speed signals.

Two or more FMM devices may be configured together for a variety of purposes. One such purpose is protection switching, where one or more protection FMM devices provide backup facilities in the event of a failure of one or more corresponding working FMM devices. Another purpose for configuring multiple FMM devices together is to provide a system that can simultaneously handle a multitude of incoming and outgoing signals.

Two FMM devices are configured together by connecting input/output (I/O) pins on one device to corresponding I/O pins on the other device. Pin count (i.e., the total number of I/O pins on a device) is a precious commodity in most integrated devices. When designing FMM devices, it is desirable to minimize the number of I/O pins that are used in configuring two (or more) FMM devices together.

In conventional SONET or SDH network-based communication systems, synchronous transport signals, such as STS-3c or STM-1, are mapped to or from corresponding higher-rate optical signals, such as a SONET OC-12 signal or an SDH STM-4 signal. The mapping of these and other synchronous transport signals to or from higher-rate optical signals generally occurs in a physical layer device commonly referred to as a mapper, which may be used to implement an add-drop multiplexer (ADM) or another node of a SONET or SDH communication system.

A need exists for improved framing synchronization control for a system with multiple mapper devices.

SUMMARY OF THE INVENTION

Generally, methods and apparatus are provided for framing synchronization control for a framer/mapper/multiplexor (FMM) device with 1+1 and equipment protection. According to one aspect of the invention, a first framer/mapper/multiplexor (FMM) device is disclosed that comprises a protection input port adapted to receive, from a second FMM device, an incoming protection signal corresponding to an incoming high-speed signal received at the second FMM device; and signal-processing circuitry adapted to generate one or more internal signals from the incoming protection signal, wherein the signal-processing circuitry synchronizes the one or more internal signals by changing a phase of the one or more internal signals without changing a frequency of the one or more internal signals based on a desired phase at a destination of each of the one or more internal signals, wherein the destination is a multiplexer that generates an outgoing high-speed signal from one or more switching-level signals. A programmable synchronization signal may optionally be employed for the synchronization.

The first FMM device optionally further comprises a high-speed output port adapted to transmit the outgoing high-speed signal to the high-speed network and wherein the one or more internal signals comprises at least one set of one or more incoming low-speed signals received at the second FMM device. The multiplexer generates the outgoing high-speed signal from switching-level signals corresponding to the at least one set of one or more incoming low-speed signals.

In one embodiment, the first FMM device communicates with at least one slave FMM device, and wherein the multiplexer is in an outgoing high-speed signal path of the at least one slave FMM device. In such an embodiment, the synchronization is based on a programmable synchronization signal generated in the first FMM device.

According to another aspect of the invention, a first FMM device is disclosed that comprises a protection input port adapted to receive, from a second FMM device, an incoming protection signal corresponding to an incoming high-speed signal received at the second FMM device; and signal-processing circuitry adapted to generate one or more internal signals from the incoming protection signal, wherein the signal-processing circuitry synchronizes the one or more internal signals by changing a phase of the one or more internal signals without changing a frequency of the one or more internal signals based on a desired phase at a destination of each of the one or more internal signals, wherein the destination is a switch that selects between switching-level signals from the incoming protection signal and switching-level signals from an incoming working signal.

According to yet another aspect of the invention, a first FMM device is disclosed that comprises a protection input port adapted to receive, from a second FMM device, an incoming protection signal corresponding to an incoming high-speed signal received at the second FMM device; a low-speed input port adapted to receive a first set of one or more incoming low-speed signals from a low-speed network; a high-speed output port adapted to transmit an outgoing high-speed signal to a high-speed network; and signal-processing circuitry adapted to generate at least one set of one or more switching-level signals from the first set of one or more incoming low-speed signals, wherein the first set of one or more incoming low-speed signals are aligned based on a desired phase at a multiplexer that generates the outgoing high-speed signal from the at least one set of one or more switching-level signals. The alignment can be performed, for example, by a frame control module in a mapper device that generates a set of one or more switching-level signals from one or more incoming low-speed signals; or by a frame control module in a mapper device of a slave FMM device, wherein the mapper device generates a set of one or more switching-level signals from one or more incoming low-speed signals.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements.

FIG. 1 contains table 100 which lists and compares the bandwidth units used by SONET and SDH.

FIG. 21A illustrates a timing diagram for the system framing signal (THSSYNC) for the master device of FIG. 15;

FIG. 21B illustrates a timing diagram for the system framing signal (THSSYNC) for the slave devices of FIG. 15;

DETAILED DESCRIPTION

Figure 2:
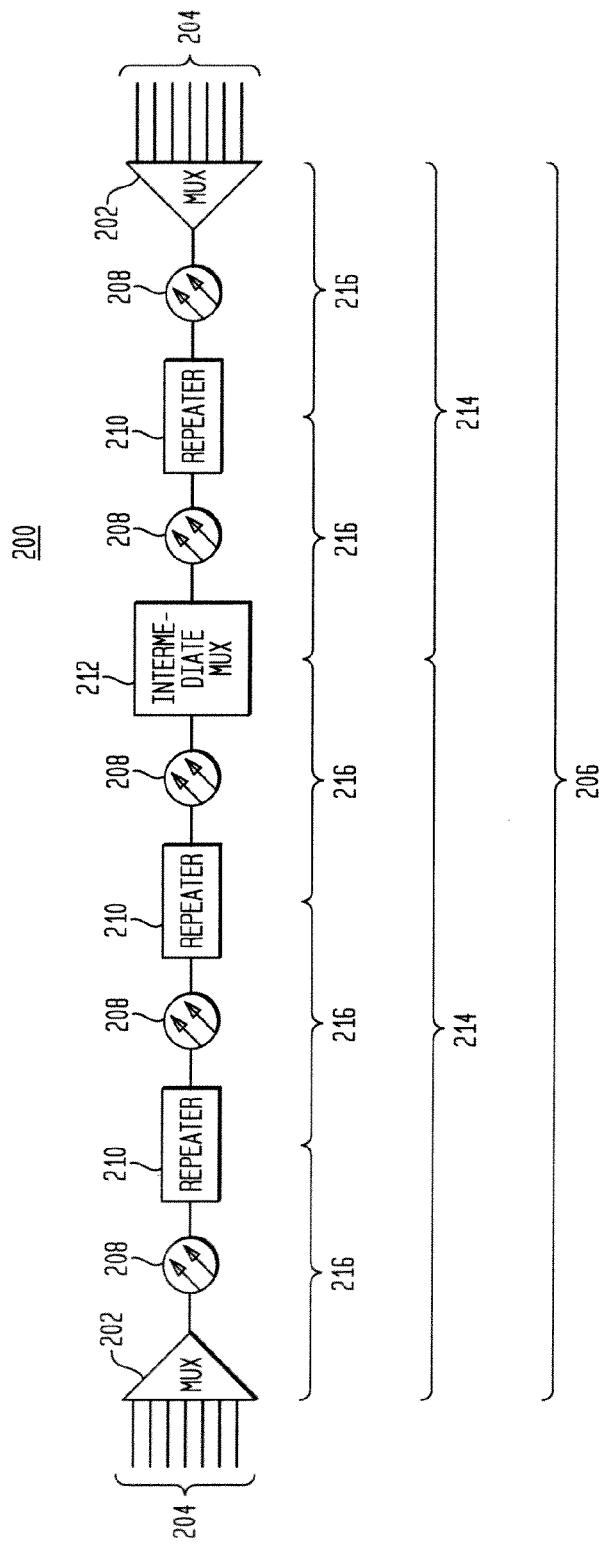
FIG. 2 is a depiction of a typical SONET/SDH point-to-point network 200 and identifies the functional regions of such a network.

The present invention provides frame synchronization control for a system with multiple mapper devices. According to one aspect of the invention, an exemplary ultramapper device is disclosed having a mate interconnect interface that provides three OC-3 protection channels for chip-to-chip interconnection between a master device and one or more slave devices for receive data protection. According to a further aspect of the invention, an ATCA mate interface provides three STS-3 protection channels for chip-to-chip interconnection between a master device and one or more slave devices for transmit data protection. In addition, the disclosed exemplary ATCA block provides a pseudo SONET/SDH STS-24 protection channel for primary/secondary board-to-board connections. An ATCA pointer mover moves STS-3 signals from a frame synchronization to another programmable framing synchronization. A disclosed TMUX block framing synchronization control circuit accepts system frame synchronization and generates a programmable system framing synchronization for slave devices. The disclosed system framing synchronization method allows full protection for OC-12 capable SONET/SDH APS and MSP combined with equipment protection with 8 Ultramapper-II devices.

SONET Terminology

SDH (Synchronous Digital Hierarchy) is a widely-used international standard for digital communication over both electrical and optical media. SONET (Synchronous Optical Networking) is a variant of SDH used primarily in the United States and Canada. SDH is defined by International Telecommunication Union (ITU) documents G.707 and G.708, and SONET is defined by Telcordia document GR-253-CORE. SDH and SONET are very similar standards, with the primary differences between them being nomenclature and bandwidth units.

FIG. 1 contains table 100 which lists and compares the bandwidth units used by SONET and SDH. SONET uses different terms for signals of the same bandwidth, depending on whether the signal is a photonic, optical carrier signal (OC-N) or an electrical signal (synchronous transport signal, or STS-N), while SDH uses the same terminology for both (synchronous transport module, or STM-N). SONET's basic unit of bandwidth is the STS-1/OC-1 at 51.84 megabits per second (Mbps), whereas SDH's basic unit, the STM-1, is 155.52 Mbps, exactly three times the SONET STS-1 rate. With the exception of STM-0, which is equivalent to STS-1, all SONET/SDH signals are integer multiples of these basic rates, e.g., the bandwidth of an STS-12 is exactly twelve times the bandwidth of an STS-1.

As used herein, the adjective "STS-N" refers to a signal having the rate of an STS-N signal, whether or not that signal conforms to the SONET standard. Likewise, the adjective "STM-N" refers to a signal having the rate of an STM-N signal, whether or not that signal conforms to the SDH standard.

In the attached figures and accompanying text, signals are typically denoted in an [A]×[B] format, where [A] is the number of signals and [B] is the bandwidth of each of those multiple signals in STS-1s. Thus, for example, a single STS-12 signal will be indicated as 1×12, and four STS-3 signals will be indicated by 4×3. Unless explicitly stated otherwise, it is assumed that an [A]×[B] bandwidth indication represents both the SONET and the equivalent SDH signal. Thus, for example, an indication that a device can process as 1×12 signal will mean, unless explicitly stated otherwise, that the device can not only process a single STS-12 signal, but also process the SDH equivalent of a single STS-12 signal, which is an STM-4. Similarly, a designation of 3×1 will mean both three SONET STS-1 signals and three SDH STM-0 signals, while a designation of 1×1 will mean STS-1/STM-0. In contrast, a reference to an STS-N or STM-N signal or frame will mean that specific signal/frame, and not imply the equivalent signal/frame in the other standard. Thus, a reference to an STM-8 signal/frame will mean only an STM-8 signal/frame, and not also an STS-24 frame/signal.

Mapping and Multiplexing

SONET/SDH signals are often used to transport multiple, non-SONET/SDH signals, such as 1.544 Mbps T1 signals, 2.048 Mbps E1 signals, or 44.736 Mbps DS3 signals. These non-SONET/SDH signals are typically referred to as plesiosynchronous data hierarchy signals, or PDH (plesiosynchronous meaning "near synchronous").

Typically, the gateway to a SONET/SDH network is a framer/mapper multiplexor. A framer/mapper multiplexor receives PDH/STS-1/STM-0 data from a low-speed network. The framer/mapper multiplexor places the PDH data inside STS-1/STM-1 frames, a process known as mapping. The framer/mapper multiplexor then optionally multiplexes all STS-1/STM-1 signals into a single transmit high-speed serial data signal (THSD). For example, 3 STS-1s can be multiplexed to created a single STS-3 signal, and four STS-3s can be multiplexed to create a single STS-12 signal.

The THSD signal is typically sent to an optical transceiver, which converts the electrical THSD into an optical THSD which is then transmitted over an optical fiber to a destination. An optical transceiver at the destination converts the optical received high-speed serial data signal (RHSD) into an electronic RHSD, which signal is then presented to the destination framer/mapper multiplexor. The destination framer/mapper multiplexor performs the reverse operations of de-multiplexing, de-mapping, and outputting the PDH/STS-1/STM-0 data to a low-speed network.

Network Topologies and Functional Areas

Typical network topologies for SONET/SDH networks are point-to-point and ring. FIG. 2 is a depiction of a typical SONET/SDH point-to-point network 200 and identifies the functional regions of such a network. SONET/SDH network 200 is terminated on either end by path-terminating (PTE) units 202, in this case, framer/mapper multiplexors. Multiplexors 202 receive, map, and multiplex PDH/STS-1 payload 204. The entire span 206 between PTE units 202 is the first of three functional regions identified by SONET and SDH, known in both those standards as a path.

Between PTE units 202 may be any number of individual fiber spans 208, repeaters 210, and intermediate multiplexors 212. The span 214 between any two adjacent multiplexors is the second of three functional regions, known as a line in SONET and a multiplex section in SDH. The equipment that terminates either end of a line/multiplex section is known as line terminating equipment, or an LTE unit.

The span 216 between any two adjacent network elements, whether those elements be repeaters or multiplexors, is the third and last functional region, known as a section in SONET and a Regenerator Section in SDH. The equipment that terminates the ends of a section/regenerator section is known as section terminating equipment or an STE unit.

Overhead and Frames

A SONET/SDH signal is made up of a steady succession of identically sized data structures called frames. Roughly speaking, each frame comprises overhead and payload. Overhead is similar in function to the headers and footers in an Internet packet, i.e., metadata used by network devices to successfully route payload to its destination. There are three types of overhead, one for each of the three functional regions—path overhead, line/multiplex section overhead, and section/regenerator section overhead.

Section overhead (SOH in SONET, regenerator section overhead or RSOH in SDH) is nine bytes used by every LTE, STE, and PTE unit in a SONET/SDH network. Line overhead (LOH in SONET, multiplex section overhead or MSOH in SDH) is 18 bytes used by every STE and PTE unit in a SONET/SDH network. Line and section overhead are referred to collectively as transport overhead (TOH). Path overhead (POH in both SONET and SDH) is nine bytes used solely by PTE units.

Thus, when payload arrives at a PTE unit for transmission onto a SONET/SDH network, the PTE unit generates first POH data, then LOH data, and finally SOH data for that payload. Next, the PTE unit maps the payload and overhead into SONET/SDH frames for transmission over a SONET/SDH network. Then, those frames are scrambled so as to avoid long stretches of successive ones or zeroes which can negatively impact a receiving device's ability to extract an accurate clock signal. Lastly, SOH bytes A1, A2, J0, and Z0 are then populated with unscrambled values, and the completed frames are transmitted.

Figure 3:
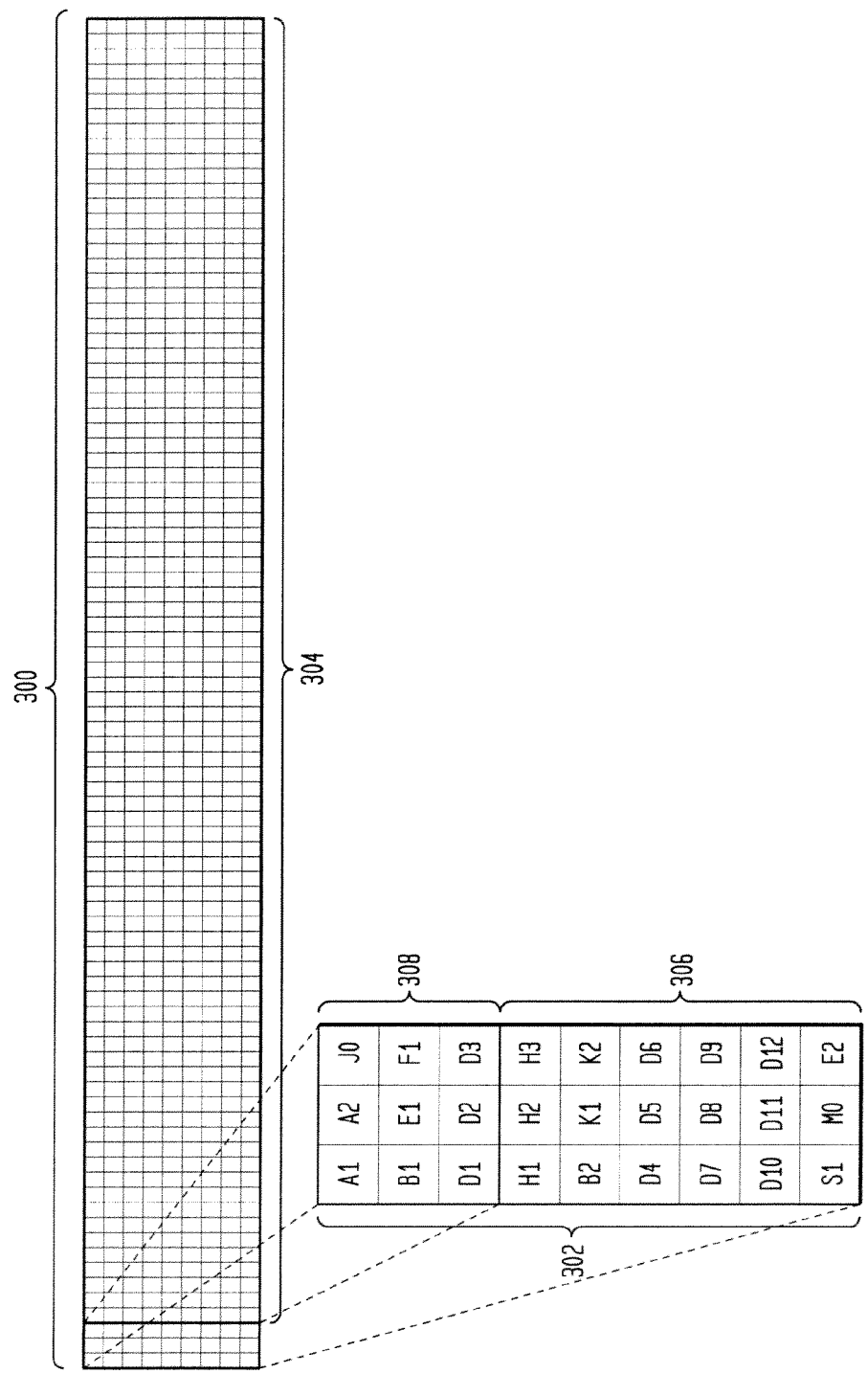
FIG. 3 is a graphical depiction of SONET's Synchronous Transport Signal Level 1 (STS-1) frame 300.

FIG. 3 is a graphical depiction of STS-1/STM-0 frame 300. By definition, an STS-1/STM-0 frame is a linear sequence of 810 bytes, and every STS-1 frame is sent in 125 microseconds, i.e., 8,000 STS-1 frames are sent every second. Thus, the bandwidth of an STS-1 signal is 8,000 frames×810 bytes×8 bits per byte=51.84 Mbps.

Furthermore, each byte in any SONET or SDH frame represents a 64 kbps channel (8,000 frames per second×1 byte×8 bits in a byte), otherwise known as a DS0, the definition of a single voice channel. Thus, overhead bytes are sometimes referred to as channels.

The 810 bytes of frame 300 comprises 27 bytes of transport overhead (TOH) 302 and 793 bytes of SONET Synchronous Payload Envelope (SPE) or SDH Virtual Container 3 (VC-3) 304.

The 27 bytes of TOH 302 in turn comprise 18 bytes of line overhead (LOH/MSOH) 306 and nine bytes of section overhead (SOH/RSOH) 308. The 27 bytes of TOH 302 are divided into nine three-byte segments, and interleaved with nine 87-byte segments of SPE/VC-3. For convenience and comprehensibility, the 810 bytes of an STS-1/STM-0 frame are typically depicted as a matrix of nine rows and 90 columns as shown in FIG. 3. Depicted in this manner, TOH 302 always occupies the first three columns of frame 300. In practice, the first row is sent from left to right, then the second row is transmitted from left to right, and so forth.

Each byte/channel of TOH 302 has a name and a defined function. SOH 308 is typically monitored and generated by every device in a SONET/SDH network. Bytes A1 and A2 are typically 1111011000101000, a unique string which marks the beginning of a frame, and which is used by devices for frame alignment, i.e., "framing on the signal." Byte J0 is a trace byte that uniquely identifies that signal. Byte B1 is a section parity byte. After a frame has been created and scrambled, a byte-interleaved parity (BIP) code will be generated over that entire frame and stored in the B1 byte of the next outbound frame. E1 is a 64 kbps voice channel used by technicians to communicate with each other while fixing problems with the section. Byte F1 is user-definable. D1, D2 and D3 form a 192 kbps channel used by STE units to exchange operations, administration, maintenance, and provisioning (OAM&P) information.

LOH 306 is typically monitored and generated only by LTE units, such as multiplexors. Bytes H1, H2, and H3 form the SONET/SDH pointer, telling LTE units where exactly in the SPE/VC-3 to find the beginning of the payload. (SONET/ SDH does not mandate that payload begin at column 4, row 1. Instead, payload can "float" throughout the SPE/VC-3.) Similar to the B1 byte, the B2 byte contains a byte-interleaved parity (BIP) code generated from all bytes in the previous frame, before scrambling, excluding SOH data. Bytes K1 and K2 are related to Automatic Protection Switching (APS), discussed in detail below. Bytes D4-D12 form a 576 kbps channel used by LTE units to exchange OAM&P information. Byte S1 is for miscellaneous synchronization purposes. Bits one through four of byte M0/M1 are currently undefined. Byte M0/M1 are for line-level remote error indication (REI-L) in an STS-1/STS-3 (STM-1) signal respectively. Upon receipt of an STS-1 frame, the receiving LTE unit compares the BIP-8 code contained in byte B2 to the received frame data. If any errors are found during this comparison, the number of those errors is encoded in bytes M0/M1 of the next frame being sent upstream to the sending LTE unit. Last, byte E2, like the E1 section-overhead byte, is typically used as a 64 kbps voice channel for technicians.

Figure 4:
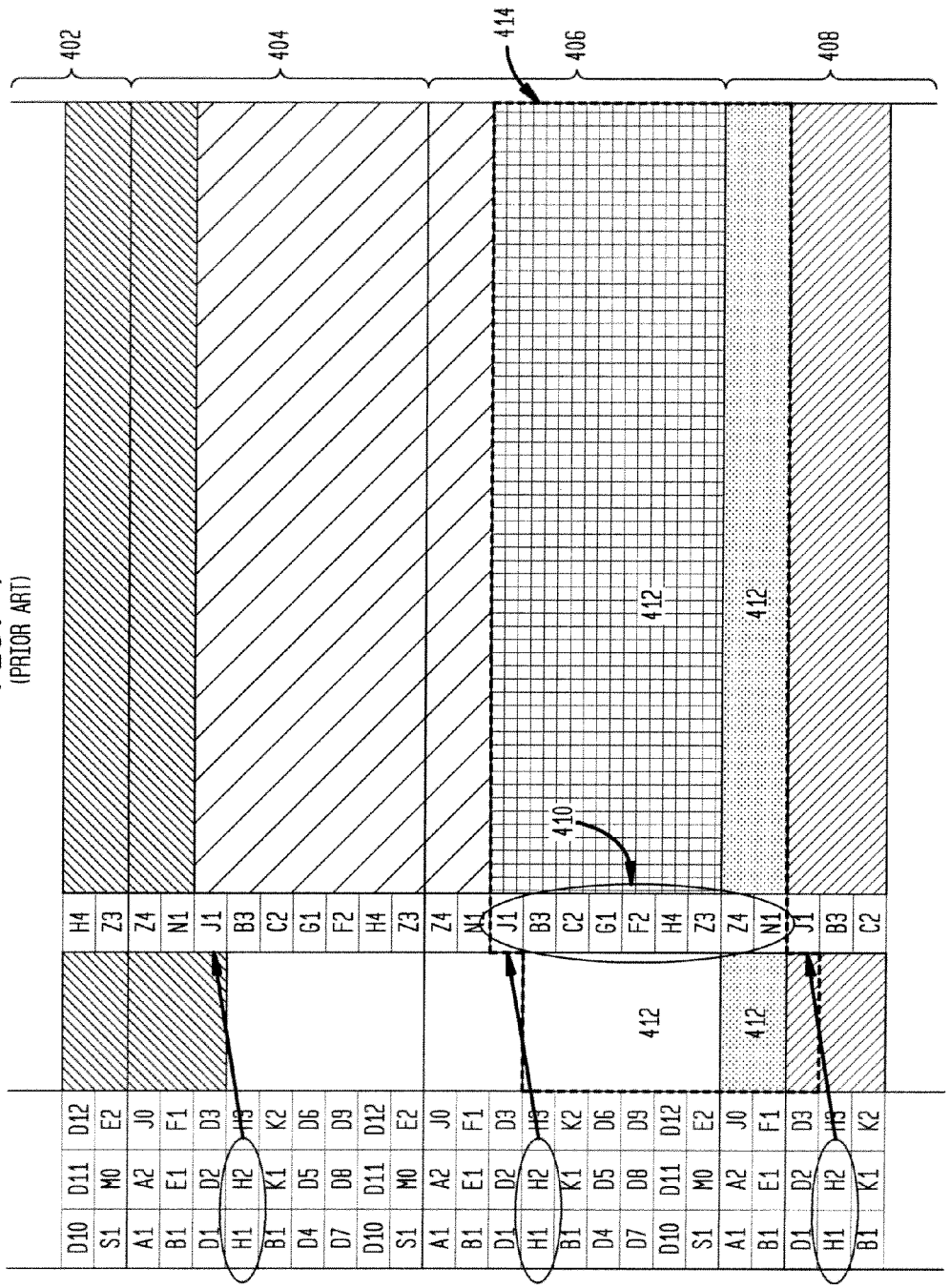
FIG. 4 is a graphical depiction of a sequence in time of several STS-1 frames 402-408 and the location and composition of the payload within those frames.

Synchronous Payload Envelope (SPE)/Virtual Container 3 (VC-3) 304 is a 793-byte container for nine bytes of path overhead (POH) and 784 bytes of payload. FIG. 4 is a graphical depiction of a sequence in time of several STS-1/STM-0 frames 402-408 and the location and composition of the payload within those frames. POH 410 is interleaved with user data 412 to form payload 414 (dotted outline): first byte J1 of POH followed by 86 bytes of payload, second byte B3 of POH followed by another 86 bytes of payload, etc.

Each of the nine bytes of POH has a designated name and function. Byte J1 is used to uniquely identify the sending device. J1 is used by path-terminating devices to ensure that a signal is coming from the appropriate device. B3 is another BIP code, similar to the B2 byte in the line overhead, generated from the contents of the previous frame's SPE/VC-3. Byte C2 indicates the nature of the user data contained within the payload, e.g., voice, ATM, FDDI, etc. Byte G1 is divided into two four-bit groups. The first four-bit group is a path remote error indicator (REI-P), similar in function to the REI-L contained in byte M0 of the line overhead. The second four-bit group is a path remote defect indicator (RDI-P). If there is a break in the connection between PTE units, then the downstream PTE unit will use the RDI-P to inform the upstream PTE unit that a break has occurred. Byte H4 is used for as a multi-frame indicator. Bytes Z3, Z4 and N1 are used for various miscellaneous purposes.

APS/MSP Protection

It is not uncommon for fiber optic signals to degrade or fail, e.g., when an unsuspecting backhoe operator accidentally tears through a buried optical fiber conduit. These signal failures result in undesirable network downtime, or a "hit." The SONET/SDH standards define mechanisms which, when implemented, enable a network to automatically recover from a hit within 50 milliseconds. This capability is known as automatic protection switching (APS) in SONET and multiplex section protection (MSP) in SDH.

There are several different APS/MSP schemes, including 1+1, 1:1, and 1:N. Each of these schemes involves protecting one or more working fibers with a protection fiber. In a typical APS/MSP implementation, the working and protection fiber(s) are geographically diverse, so that they are not both severed by the same errant backhoe. In APS/MSP, the network element (NE) that detects failure or degradation of a signal is known as the tail-end NE, and the NE that transmitted the problem signal is known as the head-end NE.

In 1:N protection, a single protection fiber protects N working fibers, and that protection fiber can carry pre-emptible non-protection traffic. If the signal on a working fiber degrades below a defined threshold, then the tail-end NE signals the head-end NE over the protection fiber using the K1/K2 channels in the LOH, and the NEs negotiate a switch of the affected signal to the protection fiber, pre-empting whatever non-protection traffic may have been on the protection fiber. 1:N can protect only one working fiber at a time, i.e., if more than one working signal fails, 1:N will be able to protect only one working signal.

In 1:1 protection, each and every working fiber is paired with a different protection fiber, and thus each and every signal can be protected. As with 1:N protection, the protection fiber can carry pre-emptible low-priority non-protection traffic, and tail-end and head-end NE negotiate the switch to a protection fiber via communication over the protection fiber.

Both 1:N and 1:1 protection suffer from several disadvantages. First, since both schemes allow a protection fiber to carry pre-emptible non-protection traffic, both schemes entail negotiation between NEs over the protection fiber to switch an affected signal onto the protection fiber. That negotiation takes a measurable amount of time, thus prolonging a hit. Furthermore, 1:N and 1:1 protection are typically revertive schemes, i.e., once a problem with a working fiber has been resolved, the switched signal is switched a second time, this time off the protection fiber and back onto the working fiber so that the protection fiber can resume carriage of non-protection traffic. This second revertive switch results in a second hit. Lastly, 1:N protection protects only one of up to 14 working fibers.

1+1 protection addresses these shortcomings by 1) pairing each working fiber with a different protection fiber and 2) requiring that each and every protection fiber carry nothing but a copy of its working fiber's signal (i.e., the protection fiber cannot carry pre-emptible non-protection traffic). In 1+1 protection, an NE bridges (i.e., splits) its THSD, transmitting one copy over a working fiber and an identical protection copy (transmit protection serial data, or TPSD) over a protection fiber. Consequently, every NE receives two signals: a working receive high-speed serial data (RHSD) signal and a receive protection high-speed serial data (RPSD) signal.

Because both working and protection fibers carry identical signals, no negotiation between NEs is required in the event of a fault. Instead, a fault-detecting tail-end NE unilaterally switches to the protection fiber and the RPSD signal, resulting in a briefer hit. Furthermore, since there is no difference between protection and working fibers, there is typically no need to switch back to an original fiber after problem resolution, i.e., 1+1 protection is typically non-revertive. 1+1 protection thus reduces both the number and duration of hits.

Figure 5:
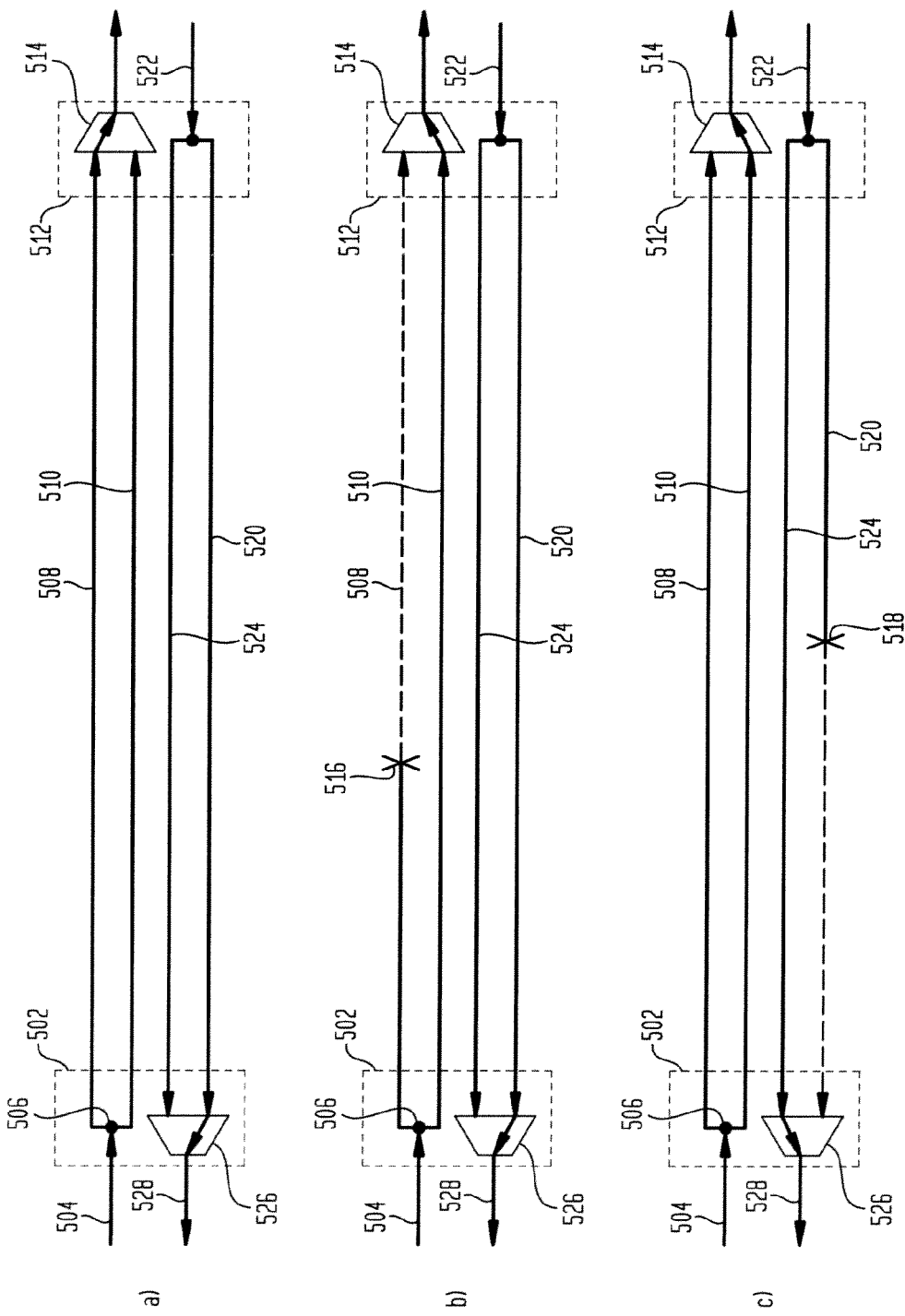
FIG. 5 illustrates Automatic Protection Switching (APS)/Multiplex Section Protection Switching (MSP) 1+1 protection.

FIG. 5 illustrates Automatic Protection Switching (APS)/Multiplex Section Protection Switching (MSP) 1+1 protection. In FIG. 5(*a*), NE 502 bridges THSD 504 at node 506 and sends the two identical signals (THSD and TPSD) over fibers 508 and 510 to NE 512. NE 512 contains switch 514 which can select between fibers 508 and 510. As depicted in FIG. 5(*a*), switch 514 has selected fiber 508, which means that fiber 508 is the working fiber and fiber 510 is the protection fiber.

Switch 514 continuously compares the quality of the RHSD received over working fiber 508 and the TPSD received over protection fiber 510. If, as depicted in FIG. 5(*b*), working fiber 508 is cut at point 516 and a loss-of-signal (LOS) condition results, then, according to the APS specification, switch 514 will switch to protection fiber 510 within 50 milliseconds. With respect to cut 516 in FIG. 5(*b*), NE 502 is the transmitting NE or head-end NE, and NE 512 is the receiving NE or tail-end NE.

In FIG. 5(c), these roles are reversed. Now, relative to cut 518 in fiber 520, NE 512 is the head-end NE, bridging THSD 522 onto fibers 520 and 524, and NE 502 is the tail-end. Switch 526 in tail-end NE 502 detects LOS in working fiber 520 and switches to protection fiber 524 to yield signal 528.

Rings Topologies: UPSRs

There are two common types of SONET/SDH ring topologies: Unidirectional Path-Switched Rings (UPSR) and Bi-directional Line-Switched Rings (BLSR). UPSRs can be viewed as a particular implementation of 1+1 protection.

Figure 6:
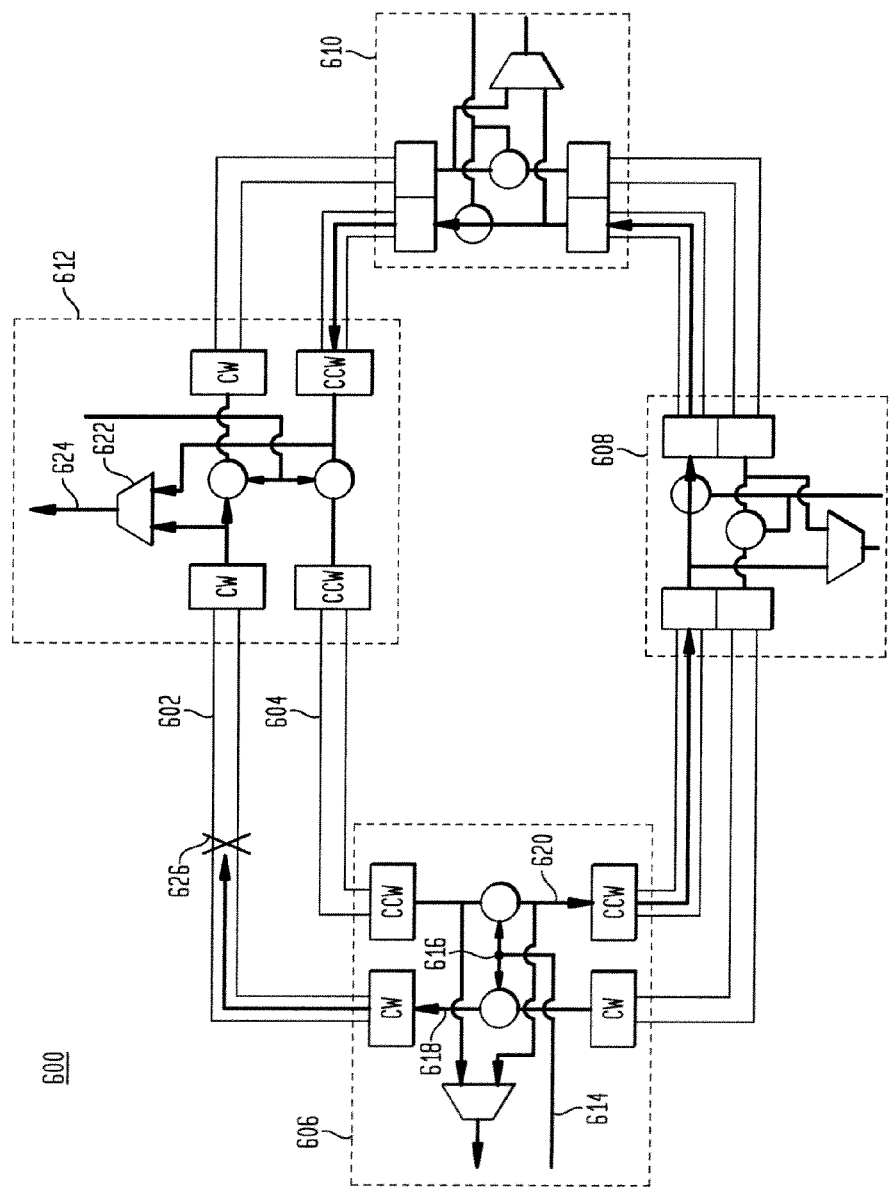
FIG. 6 is a diagram of Unidirectional Path-Switched Ring (UPSR) 600.

FIG. 6 is a diagram of Unidirectional Path-Switched Ring (UPSR) 600. UPSR 600 comprises clockwise (CW) fiber loop 602 and counter-clockwise (CCW) fiber loop 604. Fiber loops 602 and 604 connect NEs 606, 608, 610, and 612. NE 606 receives THSD 614 to be transmitted to NE 612. NE 606 bridges THSD 614 at node 616 and sends THSD 618 over CW fiber loop 602 and TPSD 620 over CCW fiber loop 604. Absent any network problems, receiving NE 612 receives both THSD 618 and TPSD 620 (which become 612's RHSD and RPSD, respectively) and compares the quality of the two signals. Based on the results of that comparison, switch 622 selects the higher-quality copy as signal 624 to be used for processing.

Thus, for example, if a break occurs in CW fiber loop 602 at point 626, then switch 622 in receiving NE 612 will select TPSD 620 on CCW fiber loop 604 as its receive signal.

UPSRs allow switching at the path level. For example, assume that THSD signal 614 was an STS-12 signal comprising 12 multiplexed STS-1 signals. Receiving NE 612 can compare each of those STS-1 signals and choose the higher-quality signal. Thus, receiving NE 612 may choose STS-1 signals 1, 2, 3, 7, 9, and 12 from CW fiber loop 602 and STS-1 signals 4, 5, 6, 8, 10, and 11 from CCW fiber loop 604.

Equipment Protection

While 1+1 protection guards against loss or degradation of a signal due to problems with a communication channel (e.g., a fiber span), it does not guard against equipment failure, e.g., the failure of NEs 502 or 512 in FIG. 5. Equipment protection refers to the practice of pairing each working device with an identical protection device. If the working device fails or its performance falls below a defined threshold, then the protection device becomes the working device. Equipment protection is not defined by a standard or specification like APS/MSP, but is instead implemented by manufacturers in the manner of their choosing.

Figure 7:
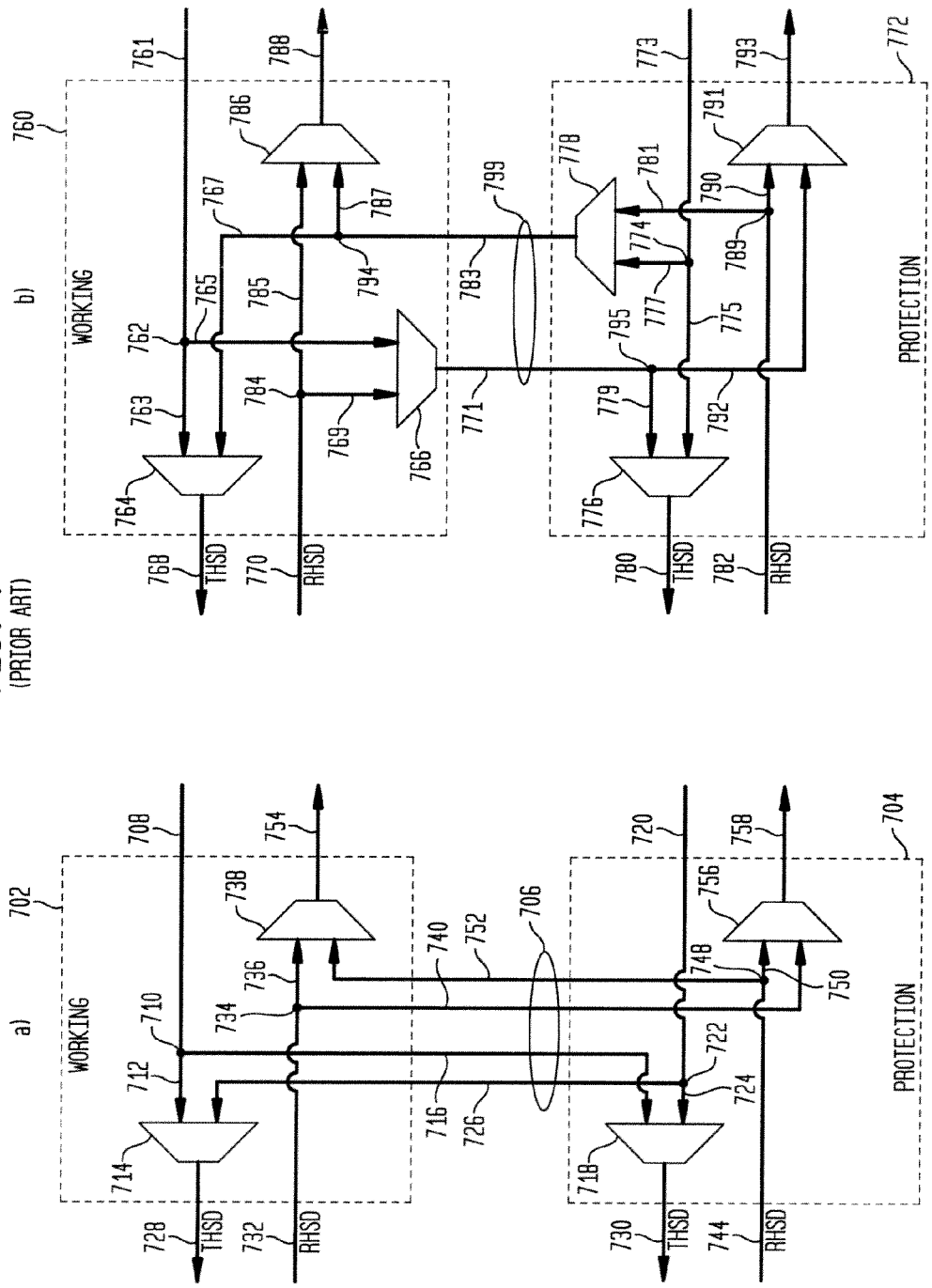
FIGS. 7(a) and 7(b) are block diagrams of two equipment protection configurations where the network elements (NEs) being protected are framer/mapper multiplexors 702 and 704.

FIGS. 7(a) and 7(b) are block diagrams of two equipment protection configurations where the network elements (NEs) being protected are framer/mapper multiplexors 702 and 704. In FIG. 7(a), NE 702 is the working device, and NE 704 is the protection device. NEs 702 and 704 are connected by protection link 706. Typically, NEs 702 and 704 are separate cards that slot into a backplane in a rack cabinet, and protection link 706 is a backplane protection link between those two cards.

A salient characteristic of the equipment protection configuration of FIG. 7(a) is that each of NE 702 and 704 is sending both a copy of its RHSD and a copy of its THSD over backplane protection link 706. Thus, the bandwidth of backplane connection 706 is at least twice that of either NE. For example, if NEs 702 and 704 are transmitting/receiving a 1×12 signal to/from a SONET/SDH network, then backplane protection link 706 must comprise four 1×12 links (i.e., four differential signals).

In the transmit direction, NE 702 receives payload signal 708 from a low-speed network. Bridging node 710 sends copy 712 of signal 708 to THSD switch 714, and sends a second copy 716 of signal 708, to THSD switch 718 on protection NE 704. Similarly, protection NE 704 receives payload signal 720. Bridging node 722 sends copy 724 of signal 720 to THSD switch 718, and a second copy 726 of signal 720 to THSD switch 714 on working NE 702. THSD switch 714 on working NE 702 selects between payload signal 708 and signal 716 from protection NE 704, and sends the selected THSD signal 728 to a SONET/SDH network. Likewise, THSD switch 718 on protection NE 704 selects between payload signal 724 and signal 716 from working NE 702, and sends the selected THSD signal 730 to a SONET/SDH network.

In the receive direction, working NE 702 receives RHSD 732 from a SONET/SDH network. Bridging node 734 sends RHSD copy 736 to RHSD switch 738, and a second copy 740 of RHSD 732 to RHSD switch 742 in protection NE 704. Likewise, protection NE 704 receives RHSD 744 from a SONET/SDH network. Bridging node 748 sends a copy 750 of RHSD 744 to RHSD switch 742, and a second copy 752 of RHSD 744 to RHSD switch 738 in working NE 702. RHSD switch 738 selects between RHSD 736 and RPSD 752 and transmits the selected signal 754 to a low-speed network. Similarly, RHSD switch 756 selects between RHSD 750 and signal 740, and transmits the selected signals 758 to a low-speed network.

The configuration of FIG. 7(b) differs from the configuration of FIG. 7(a) in that, while each NE makes a copy of both its THSD and RHSD, each NE selects and sends only one of those signals (transmit protection high-speed serial data, or TPSD) over backplane protection link 799 to the opposing card, where that signal becomes receive protection high-speed serial data, or RPSD. Thus, the bandwidth of the backplane protection link 799 is equal to the bandwidth of each of the cards.

In the transmit direction of FIG. 7(b), NE 760 receives payload signal 761 from a low-speed network. Bridging node 762 sends copy 763 of signal 761 to THSD switch 764, and sends a second copy 765 of signal 761 to TPSD switch 766. THSD switch 764 selects between signal 763 and RPSD signal 767, and transmits the selected THSD signal 768 to a SONET/SDH network. TPSD switch 766 selects between a copy 769 of RHSD 770 and signal 765 and sends the selected TPSD signal 771 over backplane protection link 799 to working NE 772 where it becomes RPSD.

Similarly, protection NE 772 receives payload signals 773 from a low-speed network. Bridging node 774 sends copy 775 of signal 773 to THSD switch 776, and a second copy 777 of signal 773 to TPSD switch 778. THSD switch 776 selects between signal 775 and RPSD signal 779, and transmits the selected THSD signal 780 to a SONET/SDH network. TPSD switch 778 selects between signal 777 and copy 781 of RHSD 782, and sends the selected TPSD signal 783 over backplane protection link 799 to protection NE 760 where it becomes RPSD.

In the receive direction, working NE 760 receives RHSD 770 from a SONET/SDH network. Bridging node 784 sends RHSD copy 785 to RHSD switch 786, and second copy 769 to TPSD switch 766. RHSD switch 786 selects between RHSD copy 785 and RPSD copy 787, and transmits selected signal 788 to a low-speed network. TPSD switch 766 selects between RHSD copy 769 and copy 765 of signal 761, and transmits selected TPSD signal 771 over backplane protection link 799 to protection NE 772 where it becomes RPSD.

Likewise, protection NE 772 receives RHSD 782 from a SONET/SDH network. Bridging node 789 sends a copy 790 of RHSD 782 to RHSD switch 791, and a second copy 781 of RHSD 782 to TPSD switch 778. RHSD switch 791 selects between RHSD copy 790 and RPSD 792, and transmits the selected signal 793 to a low-speed network. TPSD switch 778 selects between RHSD copy 781 and copy 777 of signal 773, and sends the selected signal as TPSD 783 over backplane connection 799 to working NE 760 where it become RPSD.

Since a hit can result from either faulty connections or faulty equipment, it is desirable for SONET/SDH implementations to include both APS/MSP protection and equipment protection.

Ultramapper Version 3 (UMv3 device)

The Ultramapper Version 3 (UMv3) device from LSI Corporation of Milpitas, Calif. is a SONET/SDH framer/mapper multiplexor. The UMv3 device is a single integrated circuit or "chip." A single UMV3 device can send/receive at most a 1×12 signal, i.e., an STS-12 or an STM-4 signal, to/from a SONET/SDH network, and can process (i.e., map/multiplex/de-map/de-multiplex) that entire 1×12 signal if it consists solely of three STS-1 signals or six clearchannel DS-3 signals. However, a UMv3 device can only process an STS-3 or STM-1 of PDH payload, i.e., a payload comprising signals with rates lower than an STS-1/STM-0 or clearchannel-DS3. The UMv3 device also includes a 1×12 protection link which uses four pins and provides 1+1 and equipment protection. The protection configuration of the UMv3 device is similar to configuration 7(*b*) of FIG. 7, i.e., the bandwidth of the protection link is equal to the bandwidth of each of the cards, and only selected signals are sent across the protection link.

A single UMv3 device comprises several functional modules. One of those modules, the TMUX, is responsible for sending/receiving SONET/SDH signals to/from a SONET/SDH network. The TMUX can operate in one of two modes. In STS-12 mode, the TMUX sends/receives at most a 1×12 of data to/from a SONET/SDH network. In STS-3 mode, the TMUX sends/receives at most a 1×3 of data to/from a SONET/SDH network.

One or more UMv3 devices can be configured in various configurations to perform specific tasks. Four of these configurations are relevant to this discussion. First, if the task is to process a single 1×3 signal from a SONET/SDH network, then a single UMv3 device is set to TMUX STS-3 mode, a configuration known as one-device OC-3 configuration. Second, if the task is to process from a SONET/SDH network a single 1×12 signal whose payload comprises more than a 1×3 of PDH/STS-1/STM-0 signals, but less than the limit of three STS-1 or six clearchannel DS3 signals, then a single UMv3 device is set to TMUX STS-12 mode, a configuration known as one-device OC-12 configuration. Third, if the task is to process a single 1×12 signal from a SONET/SDH network whose payload comprises more than a 1×3 of PDH/STS-1/STM-0 signals or six clearchannel DS3 signals, then four UMv3 devices are configured in four-device OC-12 configuration. In this configuration, one UMv3 device, the master, is set to STS-12 mode, and the other three UMv3 devices, the slaves, are set to STS-3 mode. The three slaves then communicate with the master via a Mate Interface on the master UMv3 device. Lastly, if the task is to process four 1×3 signals, then four UMv3 device are each set to STS-3 mode, a configuration known as four-device quad-OC-3 configuration.

Figure 8:
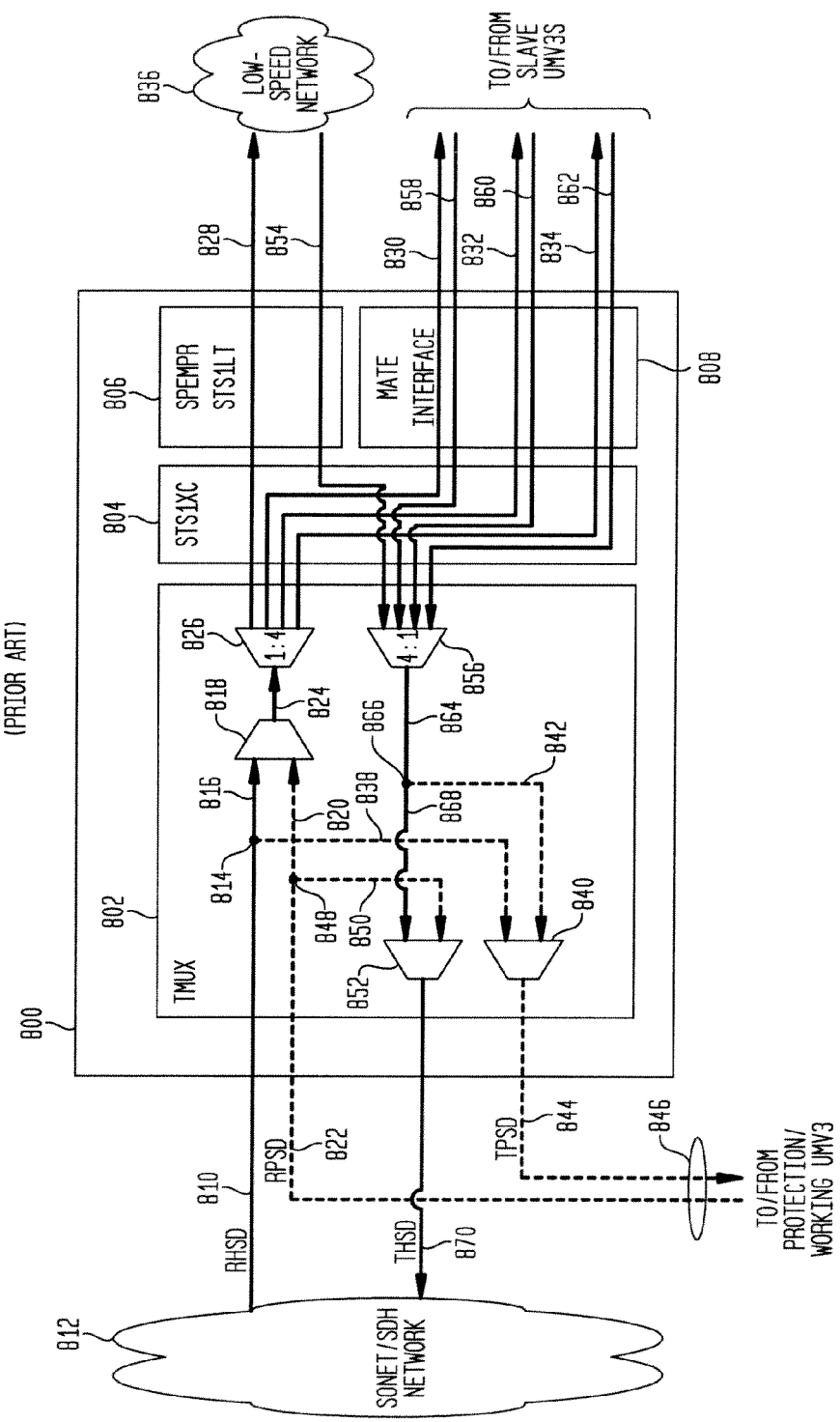
FIG. 8 is a block diagram of single Ultramapper Version 3 (UMv3) device 800 and the various devices with which it communicates.

FIG. 8 is a block diagram of single Ultramapper Version 3 (UMv3) device 800 and the various devices with which it communicates. UMv3 device 800 comprises TMUX 802, STS1XC 804 (STS-1-level cross-connect), SPEMPR/STS1LT module 806 (SPE Mapper, STS-1 line termination), and Mate Interface 808.

In the receive direction, RHSD signal 810 is received from SONET/SDH network 812 and sent to TMUX 802 where it is bridged by bridging node 814. RHSD copy 816 goes to RHSD switch 818. RHSD switch 818 selects between RHSD copy 816 and copy 820 of RPSD signal 822 received from a protection UMv3 device. Selected RHSD signal 824 is sent to 1:4 multiplexor 826. If UMv3 device 800 is the master UMv3 device in four-device OC-12 configuration, then multiplexor 826 de-multiplexes signal 824 into four 1×3 signals 828, 830, 832, and 834. Otherwise (e.g., signal 824 is a 1×3), signal 824 passes unchanged through mux 826 and becomes signal 828.

STS-1-Level Cross-Connect (STS1XC) 804 relays signal 828 to SPEMPR/STS1LT module 806. If signal 828 comprises PDH payload, then module 806 de-multiplexes signal 828, de-maps the payload from the de-multiplexed signals and outputs at most an 1×3 of payload to Low-Speed Network 836. If, instead, signal 824 comprises STM-1/STM-0 signals, then STS1XC 804 breaks out those 1×1 signals and sends them to STS1LT 806, which then outputs the resulting signals data to Low-Speed Network 836.

Returning to bridging node 814, a second copy 838 of RHSD signal 810 is sent to TPSD switch 840. TPSD switch 840 selects between signal 838 and THSD signal 842, and sends the selected TPSD signal 844 to a protection UMv3 device over protection link 846.

If UMv3 device 800 is protected by a second UMv3 device, then RPSD signal 822 is received from that protection UMv3 device over protection link 846 and bridged by bridging node 848, with one copy 820 going to RHSD switch 818, and another copy 850 going to THSD switch 852.

In the transmit direction, SPEMPR/STS1LT module 806 receives signals 854 from Low-Speed Network 836. Module 806 maps/multiplexes those signals, and sends the resulting signal to STS1XC 804, which relays the resulting signal to 4:1 multiplexor 856 in TMUX 802. If UMv3 device 800 is the master UMv3 device in a four-device OC-12 configuration, then Mate Interface 808 will receive three 1×3 signals 858, 860, and 862 from three UMv3 device slaves, pass those signals to STS1XC 804, which will in turn relays those signals to 4:1 multiplexor 856 in TMUX 802.

If UMv3 device 800 is the master in a four-device OC-12 configuration, then 4:1 multiplexor 856 multiplexes 1×3 signals 854, 858, 860, and 862 into 1×12 THSD signal 864. Otherwise, signal 854 becomes signal 864. Signal 864 is bridged by bridging node 866, with one copy 868 going to THSD switch 852 and a second copy 842 going to TPSD switch 840. THSD switch 852 selects between THSD signal 868 and RPSD signal 850, and sends selected THSD signal 870 to SONET/SDH network 812. TPSD switch 840 selects between THSD signal 842 and RHSD signal 850 and sends selected TPSD signal 844 to a protection/working UMv3 device.

Figure 9:
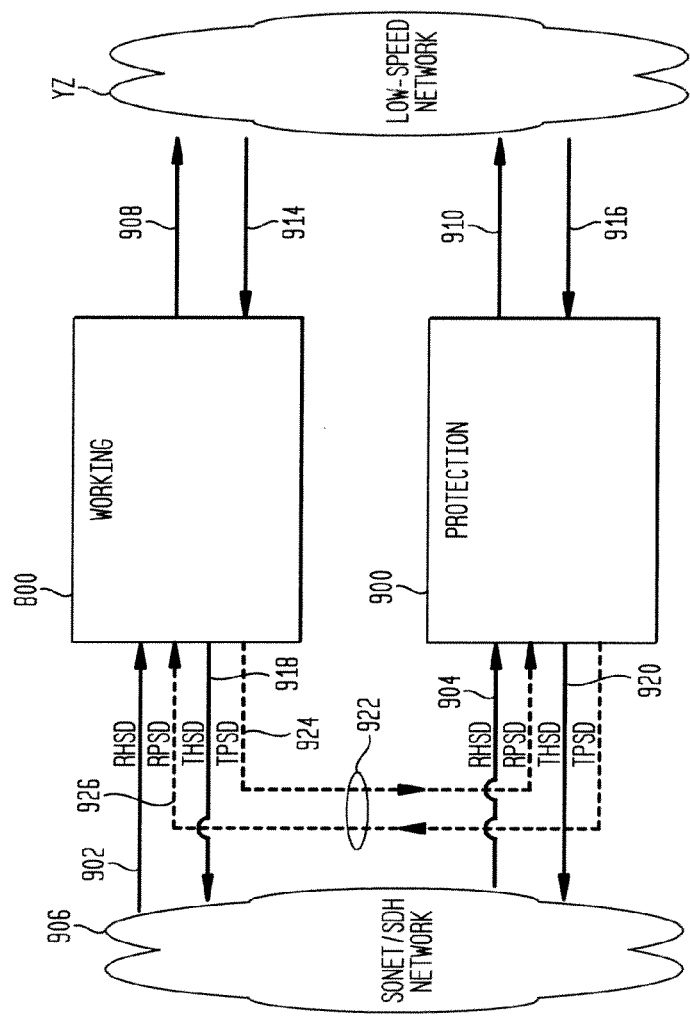
FIG. 9 is a block diagram of UMv3 device 800 of FIG. 8 in either one-device OC-3 configuration or one-device OC-12 configuration, with second UMv3 device 900 providing 1+1 and equipment protection.

FIG. 9 is a block diagram of UMv3 device 800 of FIG. 8 in either one-device OC-3 configuration or one-device OC-12 configuration, with second UMv3 device 900 providing 1+1 and equipment protection. UMv3 devices 800 and 900 are identical.

In the receive direction, UMv3 devices 800 and 900 receive RHSD signals 902 and 904, respectively, from SONET/SDH network 906 and send processed signals 908 and 910, respectively, to Low-Speed Network 912. In the transmit direction, UMv3 devices 800 and 900 receive identical copies 914 and 916, respectively, of THSD signals, and transmit single THSD signals 918 and 920, respectively, to SONET/SDH Network 906.

Linking UMv3 devices 800 and 900 is protection link 922. Protection link 922 can carry at most a 1×12 in either direction. Working card 800 sends TPSD signal 924 which becomes the RPSD signal of protection card 900. Likewise, protection card 900 sends TPSD signal 926 which becomes the RPSD of working card 800.

Four-Device OC-12 Configuration with 1+1 and Equipment Protection

Figure 10:
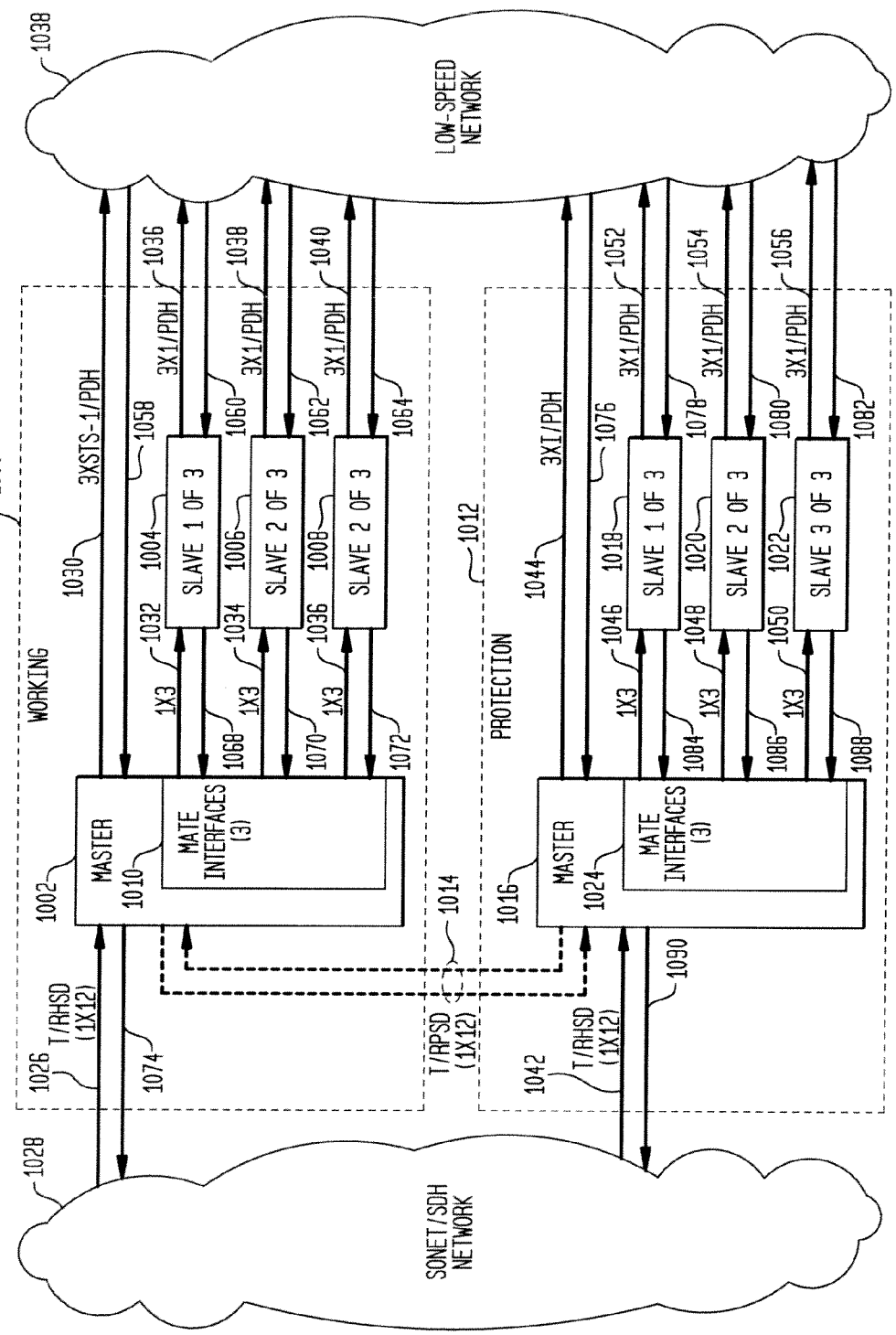
FIG. 10 is a block diagram of a UMv3 device four-device OC-12 configuration with 1+1 and equipment protection.

FIG. 10 is a block diagram of a UMv3 device four-device OC-12 configuration with 1+1 and equipment protection. Working device set 1000 comprises master UMv3 device 1002 and three slave UMv3 devices 1004, 1006, and 1008. Slave UMv3 devices 1004, 1006, and 1008 communicate with master UMv3 device 1002 via Mate Interface 1010 on master UMv3 device 1002. Working device set 1000 is protected by identical protection device set 1012 via protection link 1014. Protection device set 1012 comprises master UMv3 device 1016 and three slave UMv3 devices 1018, 1020, and 1022. Slave UMv3 devices 1018, 1020, and 1022 communicate with master UMv3 device 1016 via the Mate Interface 1024 on master UMv3 device 1016.

In the receive direction, master UMv3 device 1002 in working device set 1000 receives a 1×12 RHSD signal 1026 from SONET/SDH network 1028. Master device 1002 de-multiplexes RHSD signal 1026 into four 1×3 signals 1030, 1032, 1034, and 1036. Master device 1002 de-multiplexes/de-maps 1×3 signal 1030 itself and sends the resulting signals to Low-Speed Network 1038. Master device 1002 sends three 1×3 signals 1030, 1032, and 1034 to slave UMv3 devices 1004, 1006, and 1008, respectively, via Mate Interface 1010. Slave UMv3 devices 1004, 1006, and 1008 de-multiplex/de-map their 1×3 signals and output signals 1036, 1038, and 1040, respectively, to Low-Speed Network 1038.

Similarly, master UMv3 device 1016 in protection device set 1012 receives 1×12 RHSD signal 1042 from SONET/SDH network 1028. Master device 1016 de-multiplexes RHSD signal 1042 into four 1×3 signals 1044, 1046, 1048, and 1050. Master device 1016 de-multiplexes/de-maps 1×3 signal 1044 itself and sends the resulting signals to Low-Speed Network 1038. Master device 1016 sends three 1×3 signals 1046, 1048, and 1050 to slave devices 1018, 1020, and 1022, respectively, via Mate Interface 1024. Slave UMv3 devices 1018, 1020, and 1022 de-multiplex/de-map their 1×3 signals and output the resulting signals 1052, 1054, and 1056, respectively, to Low-Speed Network 1038.

In the transmit direction, four UMv3 devices 1002, 1004, 1006, and 1008 in working device set 1000 receive signals 1058, 1060, 1062, and 1064 from Low-Speed Network 1038. Slave UMv3 devices 1004, 1006, and 1008 map/multiplex signals 1060, 1062, and 1064, respectively, into 1×3 signals 1068, 1070, and 1072, and send signals 1068, 1070, and 1072 to Mate Interface 1010 on master UMv3 device 1002. Master UMv3 device 1002 maps/multiplexes signal 1058 into a 1×3 signal and multiplexes that signal with signals 1068, 1070, and 1072 to generate 1×12 THSD signal 1074 which is then sent to SONET/SDH Network 1028.

Similarly, protection working device set 1012 receives signals 1076, 1078, 1080, and 1082 from Low-Speed Network 1038 and sends each signal to a different one of four UMv3 devices 1016, 1018, 1020, and 1022. Slave UMv3 devices 1018, 1020, and 1022 map/multiplex signals 1078, 1080, and 1082, respectively, into 1×3 signals 1084, 1086, and 1088, and send signals 1084, 1086, and 1088 to Mate Interface 1024 on master UMv3 device 1016. Master UMv3 device 1016 maps/multiplexes signal 1076 into a 1×3 signal and multiplexes that signal with signals 1084, 1086, and 1088 to generate 1×12 THSD signal 1090 which is then sent to SONET/SDH Network 1028.

A UMv3 device set must process either its entire RHSD signal or its entire RPSD signal. In other words, if a UMv3 device set's 1×12 RPSD/RHSD signals comprise multiple lower-speed signals, e.g., 12 STS-1s, the device set cannot choose some STS-1s from RPSD and others from RHSD. This constraint is due to the fact that protection switching takes place in the TMUX block (e.g., 802 in FIG. 8), after all signals received from a low-speed network (e.g., 836 in FIG. 8), and all signals received from slave UMv3 devices (e.g., 1004, 1006, and 1008 of FIG. 10) have been multiplexed into a single THSD signal (e.g., 870 in FIG. 8), and before the RHSD signal (e.g., 810 in FIG. 8) has been de-multiplexed.

Four-Device Quad-OC-3 Configuration

Another configuration that is desired by the industry is four-device quad-OC-3 configuration. In this configuration, each of four UMv3 devices sends/receives a 1×3 signal to/from the SONET/SDH network. There is no communication between the four UMv3 devices. As such, this configuration can be viewed as four instances of one-device OC-3 configuration.

Implementing 1+1 and equipment protection in four-device quad-OC-3 configuration with UMv3 devices is cumbersome and expensive because of the number of pins required. Pins are a scarce resource. A typical protection link utilizes four pins, two for transmit, two for receive. Without a single RHSD signal or THSD signal for all four UMv3 devices, each UMv3 device must be connected to its protection UMv3 device by a separate send/receive protection link. Thus, four-device quad-OC-3 configuration requires 16 pins.

ATCA

The Advanced Telecommunications Computing Architecture (ATCA) is a standard for the design of telecommunications equipment. Among other things, the ATCA specifies the physical attributes of compliant devices, e.g., circuit board/card dimensions and how many pins can be dedicated for certain functions. As an example of the latter, the ATCA specifies that only two pins per direction may be used for APS/MSP. Consequently, full-duplex APS/MSP backplane communication between two ATCA-compliant boards can use only four pins, even if those boards contain multiple devices (e.g., four framer/mapper multiplexors in four-device quad-OC-3 configuration).

An embodiment of the present invention is a SONET/SDH framer/mapper multiplexor (FMM) device capable of APS/MSP 1+1 protection and equipment protection. The FMM device is implemented on a single integrated circuit or "chip." The FMM device is a successor to the UMv3 device of FIG. 8 and contains several improvements on, and additions to, the UMv3 device.

Like the UMv3 device, the FMM device can send/receive up to a 1×12 signal, i.e., STS-12 or STM-4 signal, to/from a high-speed network. The FMM device can map/multiplex/de-map/de-multiplex up to an STS-3/STM-1 worth of PDH data from/to a low-speed network, or up to an STS-12/STM-4 worth of STS-1/STM-0 or clearchannel DS3 signals.

In addition to a 1×12 protection link similar to the one found in the UMv3 device (e.g., 846 of FIG. 8), the FMM device contains a 1×24 ATCA-compliant protection link which allows STS-1/STM-0-level protection switching between working and protection FMM devices. Furthermore, the 1×24 protection link allows each FMM device to simultaneously send a copy of both its RHSD signal and THSD signal to the other FMM DEVICE. Thus, 1+1 and equipment protection with a FMM device resembles the configuration FIG. 7(a).

Furthermore, in addition to the Mate Interface found in the UMv3 device (e.g., interface 808 of FIG. 8), the FMM device contains an ATCA Mate Interface for communication between master and slave FMM devices. In conjunction with the ATCA-compliant protection link, the ATCA Mate Interface allows four-device quad OC-3 configuration with ATCA-compliant 1+1 and equipment protection, i.e., utilizing only two differential pins in each direction, for a total of four pins. Furthermore, the ATCA Mate Interface can process an AU-4-mapped STM-1 signal in its entirety.

A typical quad OC-3 configuration utilizing the FMM device comprises two boards, each board comprising a single master FMM device and one or more slave FMM devices. Such a configuration simultaneously provides 1+1 protection at the board level (e.g., STS-12/STM-4), at the device level (e.g., STS-3/STM-1), and at the STS-1/STM-0 level.

One-Device OC-12 Configuration

Figure 11:
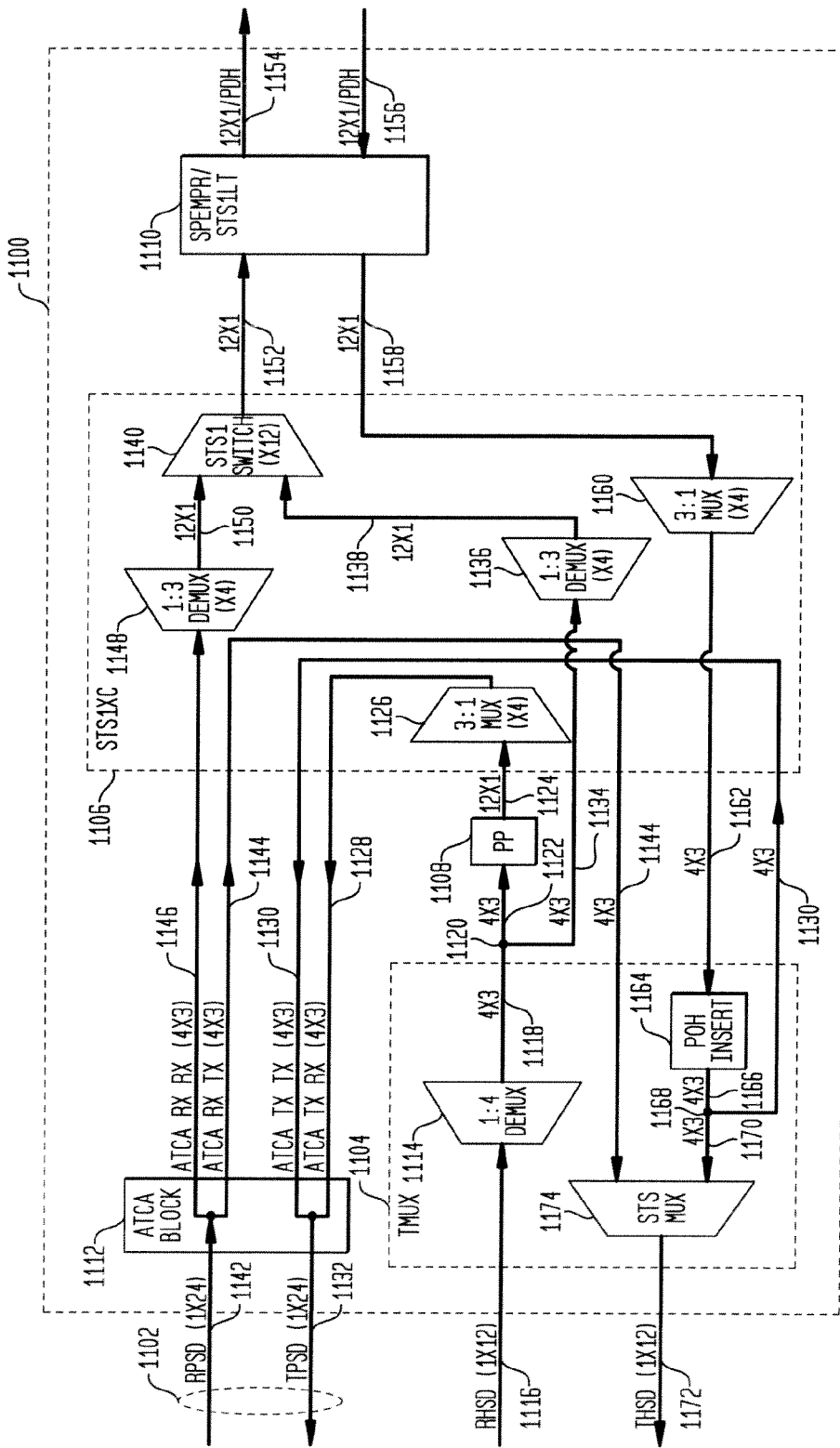
FIG. 11 is a block diagram of working Framer/Mapper Multiplexor (FMM) device 1100 in a one-device OC-12 configuration with 1+1 and equipment protection.

FIG. 11 is a block diagram of working Framer/Mapper Multiplexor (FMM) device 1100 in a one-device OC-12 configuration with 1+1 and equipment protection. Working FMM device 1100 is connected to an identical protection FMM device (not shown) by a 1×24 ATCA-compliant protection link 1102. Each of working FMM device 1100 and the protection FMM device transmits a copy (ATCA_Tx_Rx) of its RHSD signal and a copy (ATCA_Tx_Tx) of its THSD signal over protection link 1102 to the other FMM device, where those signals become ATCA_Rx_Rx and ATCA_Rx_Tx, respectively.

Working FMM device 1100 comprises modules TMUX 1104, STS-1 Cross-Connect (STS1XC) 1106, Pointer Processor 1108, SPE Mapper/STS-1 Line Terminator (SPEMPR/STS1LT) 1110, and ATCA Block 1112. Other modules of FMM device 1100 will be disclosed in later figures and discussions.

In the working receive direction, 1:4 demux 1114 within TMUX block 1104 de-multiplexes 1×12 RHSD signal 1116 into 4×3 signal 1118. Bridging node 1120 bridges signal 1118 and sends a first copy 1122 (ATCA_Tx_Rx) to Pointer Processor (PP) 1108. Pointer Processor 1108 comprises four 1:3 demuxes (not shown) which convert 4×3 signal 1122 into 12×1 signal 1124. The Pointer Processor 1108 aligns incoming frame 1122 to a new frame, based on the synchronization. In this manner, all incoming signals are aligned to a common synchronization so they can be switched and/or selected. Signal 1124 is then sent to four 3:1 muxes 1126 within STS1XC 1106 which convert 12×1 signal 1124 into 4×3 signal 1128 and send signal 1128 (ATCA_Tx_Rx) to ATCA Block 1112. ATCA Block 1112 combines 4×3 ATCA_Tx_Rx signal 1128 with 4×3 ATCA_Tx_Tx signal 1130 to create 1×24 transmit protection high-speed serial data (TPSD) signal 1132, a 1×24 signal which is then sent to the protection device over connection 1102. The ATCA_Tx_Tx signal 1130 is already aligned using the frame controller in module 1110.

Returning to bridging node 1120, a second copy 1134 of RHSD signal 1118 is sent to four 1:3 demuxes 1136 within STS1XC 1106. Demuxes 1136 convert 4×3 signal 1134 into 12×1 signal 1138 and send signal 1138 to twelve 1×1, i.e., STS-1/STM-0, switches 1140. Since module 1148 involves only switching and no multiplexing in this path, no further alignment is required in the exemplary embodiment.

In the protection receive direction, ATCA block 1112 receives from the protection FMM device 1×24 received protection serial data (RPSD) signal 1142 over connection 1102. ATCA Block 1112 de-multiplexes signal 1142 into 4×3 ATCA_Rx_Tx signal 1144 and 4×3 ATCA_Rx_Rx signal 1146. Signal 1144 is sent to STS mux 1174 in TMUX 1104 via STS1XC 1106. Signal 1146 is sent to four 1:3 demuxes 1148 which convert 4×3 signal 1146 into 12×1 signal 1150 and send signal 1150 to twelve 1×1 switches 1140.

Switches 1140 select, on an 1×1 basis, between RHSD signal 1138 or ATCA_Rx_Rx signal 1150, and send the selected 12×1 signal 1152 to SPEMPR/STS1LT 1110. An SPEMPR is a Synchronous Payload Envelope Mapper/De-Mapper, a device which maps/demaps payload data into/out of 1×1 frames. An STS1LT does not perform mapping/demapping of payload data, but instead terminates individual STS-1s or STM-0s (if any). Module 1110 outputs payload signal 1154 to a low-speed network.

In the working transmit direction, signal(s) 1156 are received by SPEMPR/STS1LT 1110. PDH signals, if any, are mapped into STS-1/STM-1 frames by the SPEMPR, and 1×1 signals, if any, are processed by the STS1LT. Module 1110 sends the resulting 12×1 signal 1158 to four 3:1 muxes 1160 within STS1XC 1106, which convert 12×1 signal 1158 into 4×3 signal 1162 and route signal 1162 to Path Overhead Insert (POH) module 1164 inside TMUX 1104.

POH Module 1164 populates the POH bytes of signal 1162, and outputs 4×3 signal 1166. Bridging node 1168 bridges signal 1166 and sends copy 1170 to STS mux 1174. STS mux 1174 comprises the following elements not shown in FIG. 11: 1) two sets of four 1:3 demultiplexers for converting 4×3 protection signal 1144 and 4×3 working signal 1170 into two 12×1 signals; 2) twelve 1×1 switches for selecting between the working and protection 12×1 signals; and 3) a 12:1 multiplexor for converting the 12×1 selected signal into 1×12 THSD signal 1172. STS mux 1174 transmits 1×12 signal 1172 to a SONET/SDH network.

Returning to bridging node 1168, a second copy 1130 of signal 1166, ATCA_Tx_Tx, is created and sent to STS1XC 1106, which routes signal 1130 to ATCA Block 1112. ATCA Block 1112 combines ATCA_Tx_Tx signal 1130 with ATCA_Tx_Rx signal 1128 to yield 1×24 transmit protection serial data (TPSD) signal 1132, a 1×24 signal. ATCA block 1112 sends TPSD 1132 to the protection FMM device over connection 1102.

In one-device OC-12 configuration, 1+1 protection switching operates in the following manner. If the quality of one or more of the 1×1 signals contained within working RHSD signal 1138 degrades below a defined threshold, then the corresponding switches 1140 in STS1XC 1106 will switch from the degraded 1×1 signal(s) to protection 1×1 signal(s) within ATCA_Rx_Rx signal 1150. Likewise, if the quality of one or more of the 1×1 signals contained within working THSD 1170 degrades below a defined threshold, then the corresponding switches within STS mux 1174 in TMUX 1104 will switch from the degraded 1×1 signal to protection 1×1 signal within ATCA_Rx_Tx signal 1144.

In one-device OC-12 configuration, equipment protection operates in the following manner. Near-end working FMM device 1100 and its protection FMM device are typically connected to a similar working/protection FMM device pair on the far end. The THSD signal of the far end working FMM device becomes RHSD signal 1116 of near-end working FMM device 1100, and THSD signal 1172 of near-end working FMM device 1100 become the RHSD signal of the far-end working FMM device. The far-end protection FMM device is similarly connected to the near-end protection FMM device. Finally, the far-end working and protection FMM devices are connected by a protection link similar to link 1102 of FIG. 11.

Both near-end working FMM device 1100 and the far-end working FMM device compare the signal quality of the working RHSD signal they receive from the other working FMM device (e.g., 1116 of FIG. 11) to the signal quality of the RPSD signal they receive from their respective protection FMM devices. Thus, if the far-end working FMM device fails altogether, then RHSD signal 1116 fails altogether, and all twelve switches 1140 switch from working RHSD signal 1138 to protection ATCA_Rx_Rx signal 1150 received from the near-end protection device. The near-end protection device is in turn receiving signal 1146/1150 from the far-end protection device.

As discussed further herein, the ATCA_RX_TX signal 1144 is aligned based on the desired destination by a pointer mover in the ATCA block 1112. In particular, the signal 1144 is aligned so that the signal 1144 at the input to the MUX 1174 is aligned with the 4×3 working signal 1170.

ATCA Block

Figure 12:
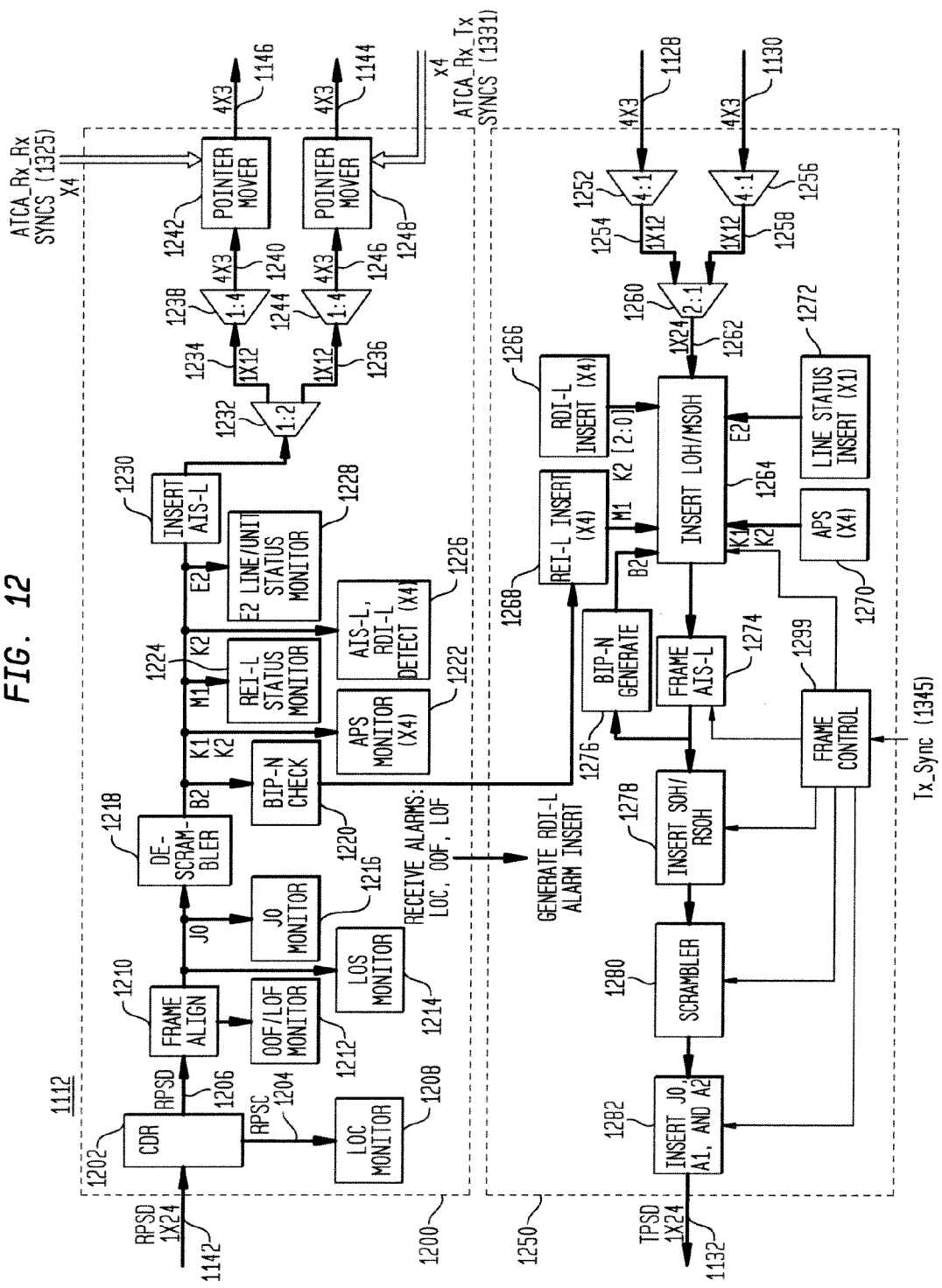
FIG. 12 is a block diagram of FMM device Advanced Telecommunications Computing Architecture (ATCA) block 1112 of FIG. 11.

FIG. 12 is a block diagram of FMM device Advanced Telecommunications Computing Architecture (ATCA) block 1112 of FIG. 11. ATCA block 1112 comprises two circuits: a receiving circuit 1202 and a transmitting circuit 1250.

Receiving circuit 1200 takes as its input 1×24 RPSD signal 1142. CDR 1202 extracts clock signal 1204 (RPSC) from RPSD 1142 and forwards RPSD signal 1142 as signal 1206. LOC Monitor 1208 monitors RPSC signal 1204 and generates a loss-of-clock (LOC) alarm if clock is lost. Frame aligner 1210 uses the A1/A2 channels in RPSD signal 1206 to frame on that signal, and sends any out-of-frame (OOF) or loss-of-frame (LOF) information to OOF/LOF Monitor 1212. OOF/LOF Monitor 1212 in turn generates alarms in response to OOF and LOF conditions. Next, loss-of-signal (LOS) detector 1214 generates an alarm if RPSD signal 1206 is lost altogether. Next, J0 monitor 1216 checks the value of the J0 byte of each RPSD frame and generates an alarm if that value does not match an expected value. Next, de-scrambler 1218 de-scrambles the scrambled portions of each RPSD frame, i.e., all data except A1, A2, J0, and Z0. Next, BIP-N check module 1220 calculates a bit-interleaved parity code for each unscrambled RPSD frame, excluding section overhead, and compares that calculated value to the value contained in the frame's B2 byte. If those two values do not match, then module 1220 communicates the number of errors found to REI-L Insert module 1268, which in turn inserts that number into the M1 byte of the next outbound TPSD frame.

Next, four Automatic Protection Switching (APS) Monitors 1222 monitor four K1/K2 channels. A typical 1×24 signal contains only one K1/K2 channel. Here, however, four K1/K2 channels have been specifically inserted into the overhead of both TSPD and RPSD signals so as to allow APS/MSP for each of the four FMM devices in four-device quad OC-3 configuration.

Next, REI-L (Remote Error Indicator-Line) Status Monitor 1224 monitors the M1 channel of the RPSD signal for error indicators inserted into RPSD frames by a protection FMM device. Next, four AIS-L/RDI-L (Alarm Indication Signal-Line/Remote Defect Indicator-Line) detectors 1226 monitor four K2 channels, one for each of four possible FMM devices.

The last of the monitors in the RPSD signal pathway is an E2 Line/Unit Status Monitor 1228. Typically, E2 is a channel reserved for voice communications between technicians during troubleshooting. In this embodiment of the present invention, however, the E2 channel is used to communicate the status of the protection FMM device to the working FMM device, and vice versa. Specifically, the E2 byte communicates to the RPSD-receiving FMM device whether the RPSD-transmitting FMM device is in one of the following alarm states: LOC, LOS, AIS-L, Signal Fail (SF), Signal Degrade (SD), or No Alarms. The value of this information is that it prevents an APS/MSP switch from a FMM device in an alarm state to another FMM device that is in a more-severe alarm state. For example, it is unwise to switch from a FMM device with intermittent LOF errors to a FMM device that is in a persistent LOS state. Utilizing the E2 channel in this manner is a quick and efficient way of sharing this information. The alternative would be for the two FMM devices to communicate via an external software program, a relatively slow process.

Next, AIS-L module 1230, if instructed to do so by software, overwrites all of the frame data, except SOH, with a scrambled pattern of all ones (i.e., "1111111 . . . "). This is typically done in response to a severe alarm (e.g., LOC, LOS). This pattern will signal to downstream devices that the upstream device has failed.

Next, 1:2 mux 1232 de-multiplexes 1×24 RPSD signal into 1×12 ATCA_Rx_Rx signal 1234 and 1×12 ATCA_Rx_Tx signal 1236. 1:4 mux 1238 de-multiplexes 1×12 ATCA_Rx_Rx signal 1234 into 4×3 signal 1240, which is then adjusted to the system timing clock by pointer mover 1242 to become signal 1146 of FIG. 11. Similarly, 1:4 mux 1244 de-multiplexes 1×12 ATCA_Rx_Tx signal 1236 into 4×3 signal 1246, which is then adjusted to the system timing clock by pointer mover 1248 to become signal 1144 of FIG. 11.

The pointer movers 1242, 1248 and the corresponding synchronization signals ATCA_Rx_Rx Syncs 1325 and ATCA_Rx_Tx Syncs 1331 are discussed further below in conjunction with FIG. 23. It is noted that each 4×3 signal 1240, 1246 is controlled by a corresponding one of the four synchronization signals 1144, 1146. Generally, the pointer movers 1242, 1248 shift the position of the input data to a common position, based on the desired destination, using a demap/remap operation on the SPE payload into a new frame before being applied to the cross connect 1106 in order to align the data for switching and/or multiplexing.

Transmitting circuit 1250 takes as its input (i) 4×3 ATCA_Tx_Rx signal 1128 transmitted by STS1XC 1106 in FIG. 11 and (ii) 4×3 ATCA_Tx_Tx signal 1130 from TMUX 1104 in FIG. 11. 4:1 mux 1252 multiplexes 4×3 ATCA_Tx_Rx signal 1128 into 1×12 ATCA_Tx_Rx signal 1254, and 4:1 mux 1256 multiplexes 4×3 ATCA_Tx_Tx signal 1130 into 1×12 signal 1258. 2:1 mux 1260 multiplexes 1×12 signals 1254 and 1258 into 1×24 transmit protection serial data (TPSD) signal 1262.

The frames of TPSD signal 1262 then enter module 1264 where various bytes in the frames' LOH/MSOH are inserted. Specifically, four RDI-L Insert modules 1266 set four K2 bytes, four REI-L Insert modules 1268 set four M1 bytes, and four K1/K2 APS modules 1270 set four sets of K1/K2 bytes. A single Line Status Insert module 1272 sets the value of the E2 byte according to the scheme described in the discussion of module 1228.

Next, the frames of TPSD signal 1262 enter Insert AIS-L module 1274 whose operation is identical to the operation of Insert AIS-L module 1230. BIP-N Generate module 1276 takes the frames outputted by module 1274 and calculates a bit-interleaved parity code over the frame, which code value is then inserted into the B2 byte of the next frame to be transmitted. Next, module 1278 inserts the Section Overhead/Regenerator Section Overhead (SOH/RSOH) and sends the resulting frames to scrambler 1280 for scrambling. Last, SOH/RSOH bytes J0, A1, and A2 are inserted into the scrambled TPSD frame by module 1282, and resulting TPSD signal 1132 is outputted over 1×24 ATCA-compliant protection link 1102 in FIG. 11.

The processing performed by modules 1264, 1274, 1278, 1280 and 1282, such as insertion of overhead bytes, are based on a counter signal generated by frame control module 1299, discussed further below in conjunction with FIG. 19, based on a Tx_Sync signal 1345.

Four-Device OC-12 Configuration with 1+1 and Equipment Protection

In four-device OC-12 configuration with 1+1 and equipment protection, a working device set, comprising one master FMM device and three slave FMM devices, is protected by a protection device set, also comprising one master FMM device and three slave FMM devices. A single ATCA-compliant 1×24 protection link between the two master FMM devices provides STS-1-level 1+1 protection and equipment protection to all eight FMM devices. Only the master FMM device in a device set sends 1×12 THSD signal to and receives 1×12 RHSD signal from a high-speed network, and only the master FMM device in a device set sends TPSD signal to and receives RPSD signal from the master FMM device in the other device set. The master FMM device and three slave FMM devices each process one-quarter of the payload.

Figure 13:
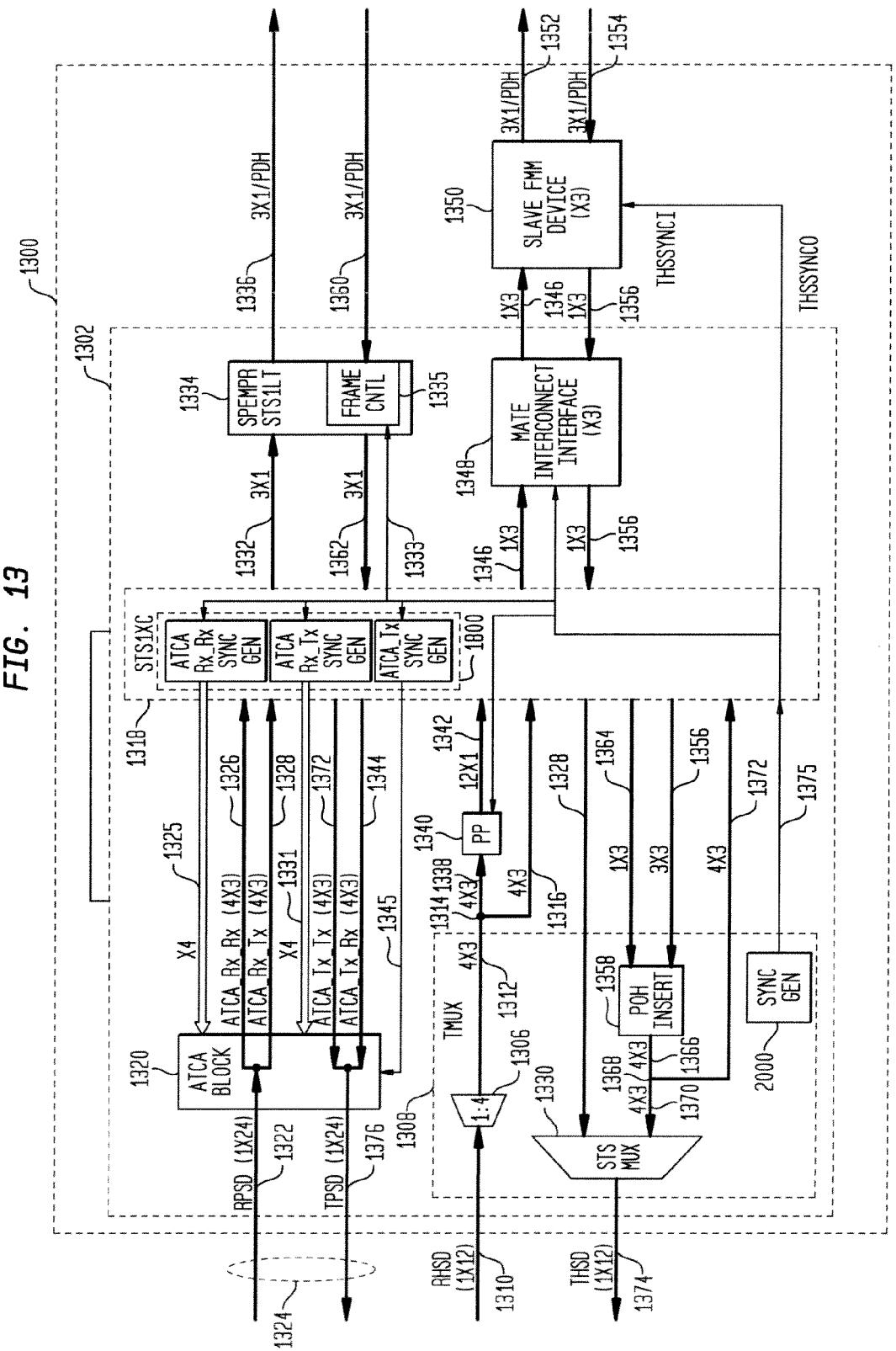
FIG. 13 is a block diagram of an implementation of four-device OC-12 configuration using FMM devices.
Figure 14:
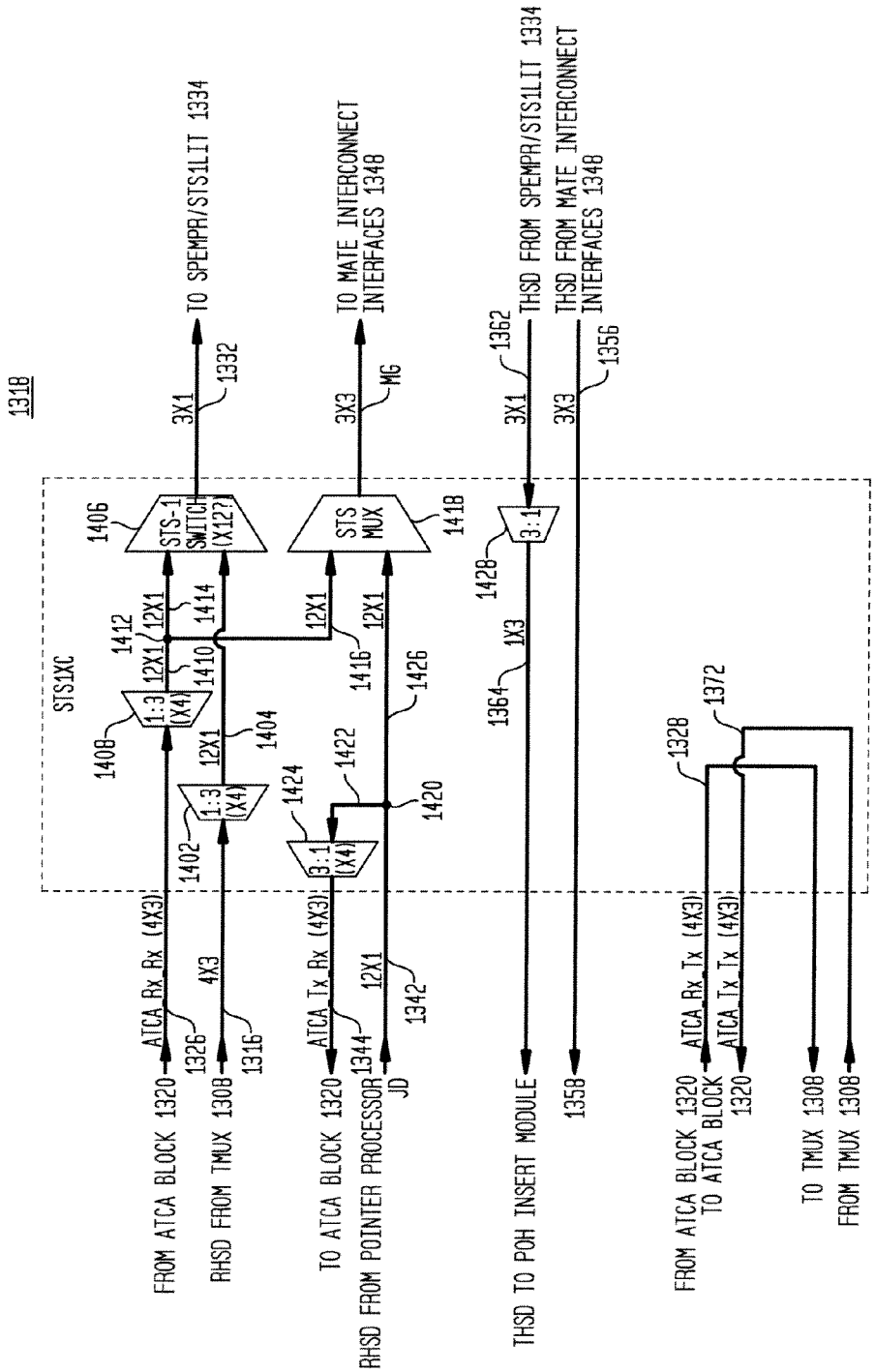
FIG. 14 is a block diagram of STS-1 Cross-Connect (STS1XC) 1318 of FIG. 13.

FIG. 13 is a block diagram of an implementation of four-device OC-12 configuration using FMM devices. FIG. 14 is a block diagram of STS-1 Cross-Connect (STS1XC) 1318 of FIG. 13.

Device set 1300 comprises master FMM device 1302 and three slave FMM devices 1304.

In the receive direction, 1:4 demultiplexer 1306 inside TMUX 1308 within master FMM device 1302 receives 1×12 RHSD signal 1310 and de-multiplexes that signal into 4×3 signal 1312. Bridging node 1314 bridges signal 1312 and sends a first copy 1316 to STS1XC 1318. There, four 1:3 demultiplexers 1402 convert 4×3 RHSD signal 1316 into 12×1 signal 1404 and send signal 1404 to twelve 1×1 switches 1406.

ATCA Block 1320 within master FMM device 1302 receives 1×24 RPSD signal 1322 over ATCA-compliant protection link 1324, and de-multiplexes signal 1322 into 4×3 ATCA_Rx_Rx signal 1326 and 4×3 ATCA_Rx_Tx signal 1328. Signal 1328 is sent to STS multiplexor 1330 within TMUX 1308. Signal 1326 is sent to four 1:3 demultiplexers 1408 within STS1XC 1318 which output 12×1 signal 1410. Bridging node 1412 bridges signal 1410, with a first copy 1414 going to 12 1×1 switches 1406, and a second copy 1416 going to STS mux 1418. Switches 1406 select three 1×1 signals, on an 1×1 basis, between ATCA_RX_RX signal 1414 and RHSD signal 1404, and send resulting 3×1 signal 1332 to SPEMPR/STS1LT 1334. Module 1334 demaps/de-multiplexes at most a 1×3 of data 1336 and transmits that data to a low-speed network.

Returning to bridging node 1314, a second copy 1338 of RHSD 1312 is sent to Pointer Processor 1340 which demultiplexes signals 1338 into 12×1 signal 1342 and outputs signal 1342 to STS1XC 1318. Within STS1XC 1318, 12×1 signal 1342 is bridged by bridging node 1420, with a first copy 1422 going to four 3:1 multiplexors 1424 which output 4×3 ATCA_Tx_Rx signal 1344 to ATCA Block 1320. A second copy 1426 of signal 1342 is sent to STS mux 1418 which comprises nine 1×1 switches and three 3:1 multiplexors (not shown). STS mux 1418 selects, on an 1×1 basis, nine 1×1 signals between 12×1 ATCA_RX_RX signal 1416 and 12×1 RHSD 1426, multiplexes those nine selected 1×1 signals into three 3×1 signals 1346, and outputs those three signals 1346 to three Mate Interconnect Interfaces 1348, respectively.

Mate Interconnect Interfaces 1348 relay signals 1346 to three slave FMM devices 1350, respectively. Slave FMM devices 1350 receive signals 1346 as RHSD signals, de-multiplex/de-map the payload from signals 1346, and output that payload as signals 1352.

In the transmit direction, each slave FMM devices 1350 receives at most a 1×3 of payload 1354 and maps/multiplexes that payload 1354 into 1×3 THSD signal 1356 which is transmitted to Mate Interconnect Interface 1348 in master FMM device 1302. Mate Interconnect Interface 1348 relays 3×3 signal 1356 to POH insert module 1358 via STS1XC 1318. SPEMPR/STS1LT module 1334 in Master FMM device 1302 receives at most a 1×3 of payload 1360 and maps/multiplexes that payload 1360 into 3×1 signal 1362 which is transmitted to 3:1 multiplexor 1428 within STS1XC JE. Multiplexor 1428 outputs a 1×3 THSD signal 1364 to POH Insert module 1358.

POH Insert module 1358 populates the POH bytes of signals 1364 and 1356 with the appropriate values, and transmits 4×3 signal 1366 to bridging node 1368. Bridging node 1368 bridges signal 1366, sending a first copy 1370 to STS multiplexor 1330 in TMUX 1308 and a second copy 1372 (ATCA_Tx_Tx) to ATCA Block 1320 via STS1XC 1318. STS mux 1330 comprises the following elements not shown in FIG. 13: 1) two sets of four 1:3 demultiplexers for converting 4×3 ATCA_Rx_Tx signals 1328 and 4×3 working signals 1370 into two sets of 12×1 signals; 2) twelve 1×1 switches for selecting between the working and protection 12×1 signals; and 3) a 12:1 multiplexor for converting the 12×1 selected signals into 1×12 THSD 1374. At ATCA Block 1320, 4×3 signal 1372 (ATCA_Tx_Tx) is multiplexed with 4×3 signal 1344 to create 1×24 TPSD signal 1376 which is then transmitted to the protection device set via protection link 1324.

In four-device OC-12 configuration, 1+1 and equipment protection switching operates in the following manner. If the quality of one or more of the 1×1 signals contained within working 1×12 RHSD signal 1310/1316 degrades below a defined threshold, then the corresponding switches 1406 in STS1XC 1318 will switch from the degraded 1×1 signal(s) to protection 1×1 signal(s) within 1×12 ATCA_Rx_Rx signal 1326. Likewise, if the quality of one or more of the 1×1 signals contained within working 1×12 THSD signal 1370 degrades below a defined threshold, then the corresponding switches 1330 inside TMUX 1308 will switch from the degraded 1×1 signal(s) to protection 1×1 signal(s) within 1×12 ATCA_Rx_Tx signal 1328. Thus, for example, if one of the slave FMM devices 1350 should fail, then three of twelve 1×1 switches 1330 would switch from the working 1×3 THSD signal 1356 belonging to that failed slave device to the equivalent 1×3 signal generated by the corresponding protection slave device and contained within ATCA_Rx_Tx signal 1328.

As shown in FIG. 13, the STS1XC 1318 includes three sync generation circuits 1800, discussed further below in conjunction with FIG. 18. Generally, the sync generation circuits 1800 generate the synchronization signals 1325, 1331, 1345 that were discussed above in conjunction with FIG. 12. These synchronization signals 1325, 1331, 1345, are based on a synchronization signal 1375 generated by a sync generation circuit 2000, discussed below in conjunction with FIG. 20, in TMUX 1308. Generally, the sync generation circuit 2000 generates a free running sync signal using a programmable set of registers to achieve the pre-shifting of the present invention (whereby the signals are synchronized based on the desired destination).

As further shown in FIG. 13, the SPEMPR/STS1LT 1334 includes a frame control circuit 1335 that operates in a similar manner to the frame control module 1299 of FIG. 12 (and discussed further below in conjunction with FIG. 19).

It is noted that the cross connect 1318 includes a switch (not shown) that selects between switching-level signals 1326 (ATCA_RX_RX) from the incoming protection signal and switching-level signals 1342 from an incoming working signal to create 3×1 signals 1346.

When the path through the cross connect 1318 is from the low-speed input port 1360 to the TMUX 1308, the incoming low-speed signals 1362 are aligned by the frame control module 1335 in the mapper 1334 based on a desired destination at the MUX 1330 so that they align with the signals 1328.

Four-Device Quad-OC-3 Configuration with 1+1 and Equipment Protection

Four-device quad-OC-3 configuration comprises two FMM device sets connected by a 1×24 ATCA-compliant protection link. Each of the two device sets comprises four FMM devices: one master and four slaves. Each slave FMM device is connected to its master FMM device using only two differential pairs in each direction and two clock/data pin pairs in each direction for a total of eight pins. The TMUX blocks of all eight FMM devices are set to STS-3 mode.

Unlike four-device OC-12 configuration, each of the four FMM devices in a device set in four-device quad-OC-3 configuration transmits/receives a separate 1×3 THSD/RHSD signal to/from a SONET/SDH network. All eight FMM devices are protected by the single protection link between the two master FMM devices, wherein none of the slave FMM devices in each device set are directly connected to any of the FMM devices in the other device set.

Figure 15:
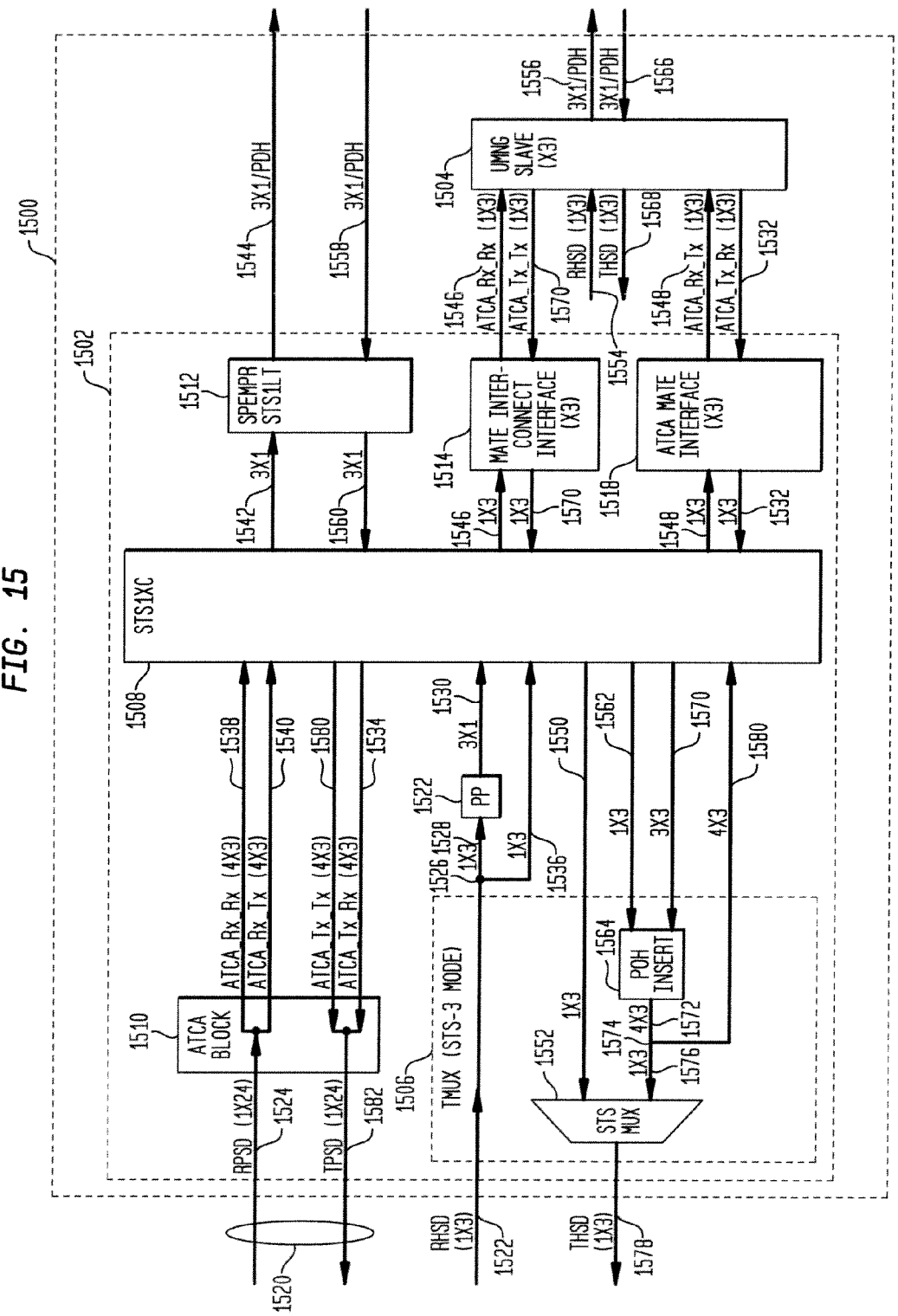
FIG. 15 is a block diagram of an implementation of four-device quad-OC-3 configuration with APS/MSP 1+1 protection and equipment.
Figure 16:
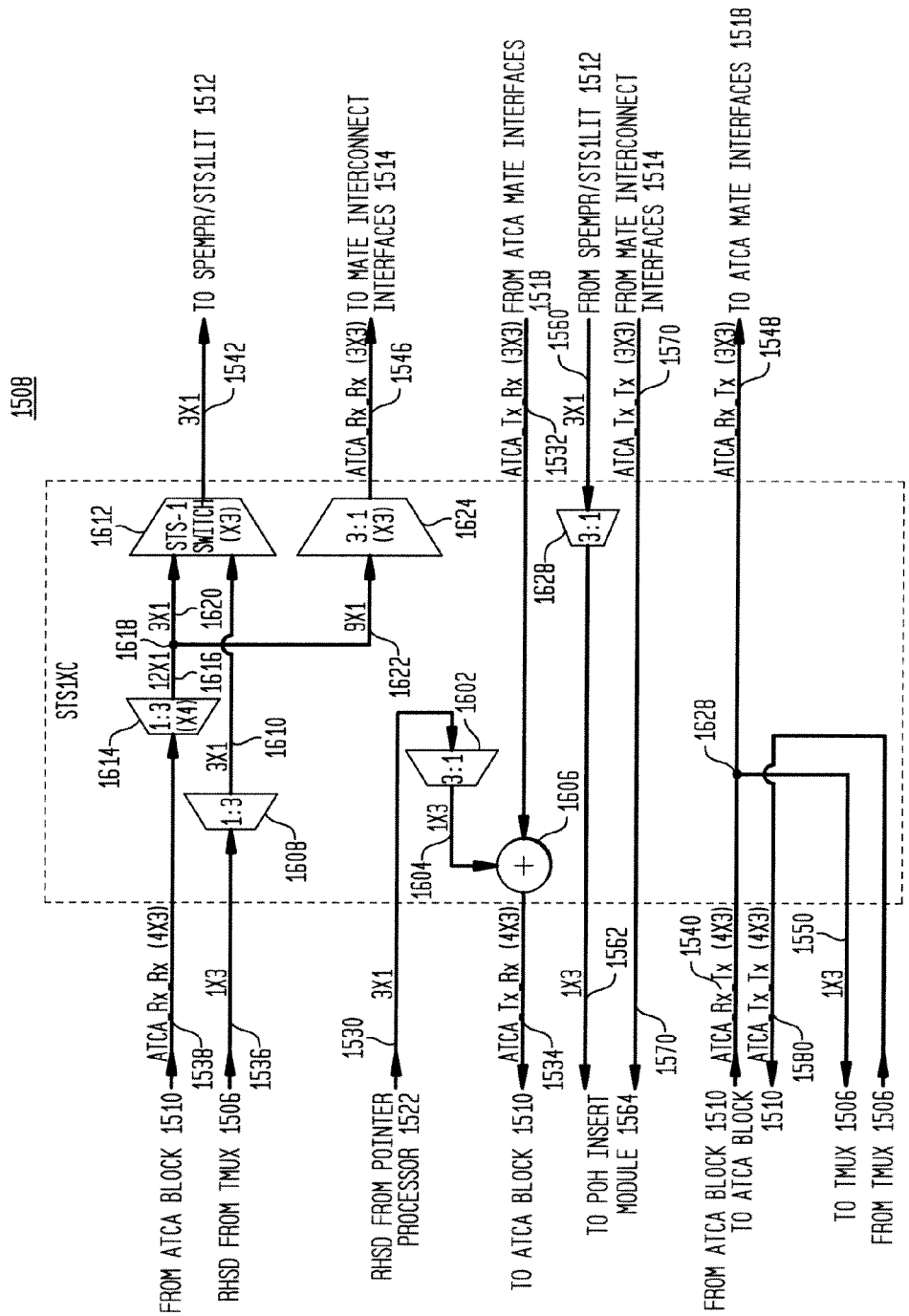
FIG. 16 is a block diagram of STS1XC 1508 of FIG. 15.

FIG. 15 is a block diagram of an implementation of four-device quad-OC-3 configuration with APS/MSP 1+1 protection and equipment. FIG. 16 is a block diagram of STS1XC 1508 of FIG. 15. Working device set 1500 comprises a master FMM device 1502 and three slave FMM devices 1504. Device set 1500 is protected by a protection device set (not shown). It is noted that the master FMM device 1502 may be embodied in a substantially similar manner to the master FMM device 1302 of FIG. 13.

In the receive direction on master FMM device 1502, TMUX 1506 receives 1×3 RHSD signal 1522 from a SONET/SDH network, and ATCA Block 1510 receives 1×24 RPSD signal 1524 from the protection device set over ATCA-compliant protection link 1520. It is noted that ATCA Block 1510 may be embodied, for example, using the ATCA Block 1112 discussed above in conjunction with FIG. 12.

TMUX 1506 relays 1×3 THSD signal 1522 to bridging node 1526. Bridging node 1526 sends a first copy 1528 to Pointer Processor 1522, which demultiplexes 1×3 signal 1528 into 3×1 signal 1530. Signal 1530 is sent to 3:1 multiplexor 1602 in STS1XC 1508, which multiplexes those signals into a 1×3 signal 1604. Summing node 1606 sums 1×3 signal 1604 and 3×3 signal 1532 from slave FMM devices 1504 and sends the resulting 4×3 ATCA_Tx_Rx signal 1534 to ATCA Block JV.

Bridging node 1526 sends a second copy 1536 of 1×3 RHSD signal 1522 to 1:3 demultiplexer 1608 within STS1XC JE. 1:3 demultiplexer 1608 outputs 3×1 signal 1610 to three 1×1 switches 1612. It is noted that the STS1XC 1508 typically has the same sync generation circuits 1800 discussed in conjunction with FIGS. 13 and 18.

ATCA Block 1510 de-multiplexes 1×24 RPSD 1524 into 4×3 ATCA_Rx_Rx signal 1538 and 4×3 ATCA_Rx_Tx signal 1540, and sends signal 1538 and signal 1540 to STS1XC 1508. 4×3 ATCA_Rx_Rx signal 1538 goes to four 1:3 demultiplexers 1614 which output 12×1 signal 1616 to node 1618. Node 1618 sends 3×1 signal 1620 to three 1×1 switches 1612. Switches 1612 select, on an 1×1 basis, between ATCA_Rx_Rx signal 1620 and RHSD signal 1610, and send the selected 3×1 signal 1532 to SPEMPR/STS1LT 1512 where at most a 1×3 of payload signal(s) 1544 are de-mapped/de-multiplexed and transmitted to a low-speed network.

Node 1618 sends the remaining 9×1 signal 1622 to three 3:1 multiplexors 1624, which in turn output three 1×3 ATCA_Rx_Rx signals 1546 to three Mate Interconnect interfaces 1514, respectively. Each interface 1514 relays 1×3 signal 1546 to their respective slave FMM device 1504.

Returning to 4×3 ATCA_Rx_Tx signal 1540 in STS1XC 1508, node 1626 sends three 1×3 signals 1548 of 1540 to three ATCA Mate Interfaces 1518, which in turn relay a single 1×3 ATCA_Rx_Tx signal 1548 to their respective slave FMM devices 1504. Node 1626 also sends 1×3 ATCA_Rx_Tx signal 1550 to STS multiplexor 1552 within TMUX 1506.

As discussed further below in conjunction with FIGS. 25 and 26, the interfaces 1514, 1518 implement the pre-shifting of the present invention, whereby the signals are synchronized based on the desired destination.

Each of three slave FMM devices 1504 (see FIG. 17 for details) also receives at most a 1×3 RHSD signal 1554 from a SONET/SDH network, and transmits at most a 1×3 of payload signals 1556.

In the transmit direction, SPEMPR/STS1LT 1512 within master FMM device 1502 receives at most a 1×3 of payload signal(s) 1558. SPEMPR/STS1LT 1512 maps/multiplexes signals 1558 into 3×1 signal 1560 which is sent to 3:1 multiplexor 1628 within STS1XC 1508. Multiplexor 1628 outputs 1×3 signal 1562 to POH Insert module 1564 in TMUX 1506.

Each of three slave FMM devices 1504 receives at most a 1×3 of payload signal(s) 1566, and transmits 1) at most a 1×3 THSD signal 1568 to a SONET/SDH network, 2) at most a 1×3 ATCA_Tx_Tx signal 1570 to Mate Interconnect interface 1514 within master FMM device 1502, and 3) at most a 1×3 ATCA_Tx_Rx signal 1532 to ATCA Mate interface 1518 on master FMM device 1502. Three Mate Interconnect interfaces 1514 relay three 1×3 ATCA_Tx_Tx signals 1570 to POH Insert module 1564 via STS1XC 1508. Three ATCA Mate interfaces 1518 relay three 1×3 ATCA_Tx_Rx signals 1532 to STS1XC 1508, where they are combined at node 1606 with 1×3 signal 1604 to yield 4×3 ATCA_Tx_Rx signal 1534 which is then sent to ATCA Block 1510.

POH Insert Module 1564 populates the POH bytes of signals 1562 and 1570 and outputs 4×3 signal 1572 to bridging node 1574. Bridging node 1574 sends a single 1×3 1576 of signal 1572 to STS multiplexor 1552. STS multiplexor 1552 comprises the following elements not shown in FIG. 15: 1) a 1:3 demultiplexer for converting 1×3 protection signal 1550 and 1×3 working signal 1576 into two sets of 3×1 signals; 2) three 1×1 switches for selecting between the working and protection signals; and 3) a 3:1 multiplexor for converting the 3×1 selected signals into 1×3 THSD signal 1578, which is then sent to a SONET/SDH network.

Bridging node 1574 sends a copy 1580 of signal 1572 via STS1XC 1508 to ATCA Block 1510 where it becomes ATCA_Tx_Tx. ATCA Block 1510 multiplexes ATCA_Tx_Tx signal 1580 with 4×3 ATCA_Tx_Rx signal 1534 to create 1×24 TPSD 1582 which is sent to the protection device set over ATCA-compliant protection link 1520.

It is noted that the cross connect 1508 includes a path (not shown) to connect the ATCA_RX_RX signal 1538 to create 1×3 signals 1548. The ATCA_RX_RX signal 1538 is aligned by the pointer mover in the path so that it aligns at a multiplexer 1552 in an outgoing high-speed signal path of the slave FMM device 1504.

When the path through the cross connect 1508 is through the mate 1514 from a slave device 1504, to the TMUX 1506, the incoming low-speed signals 1570 are aligned by the frame control module 1335 in the mapper 1334 of the slave 1504 based on a desired destination at the MUX 1552 so that the signals 1576 align with the signals 1550.

Figure 17:
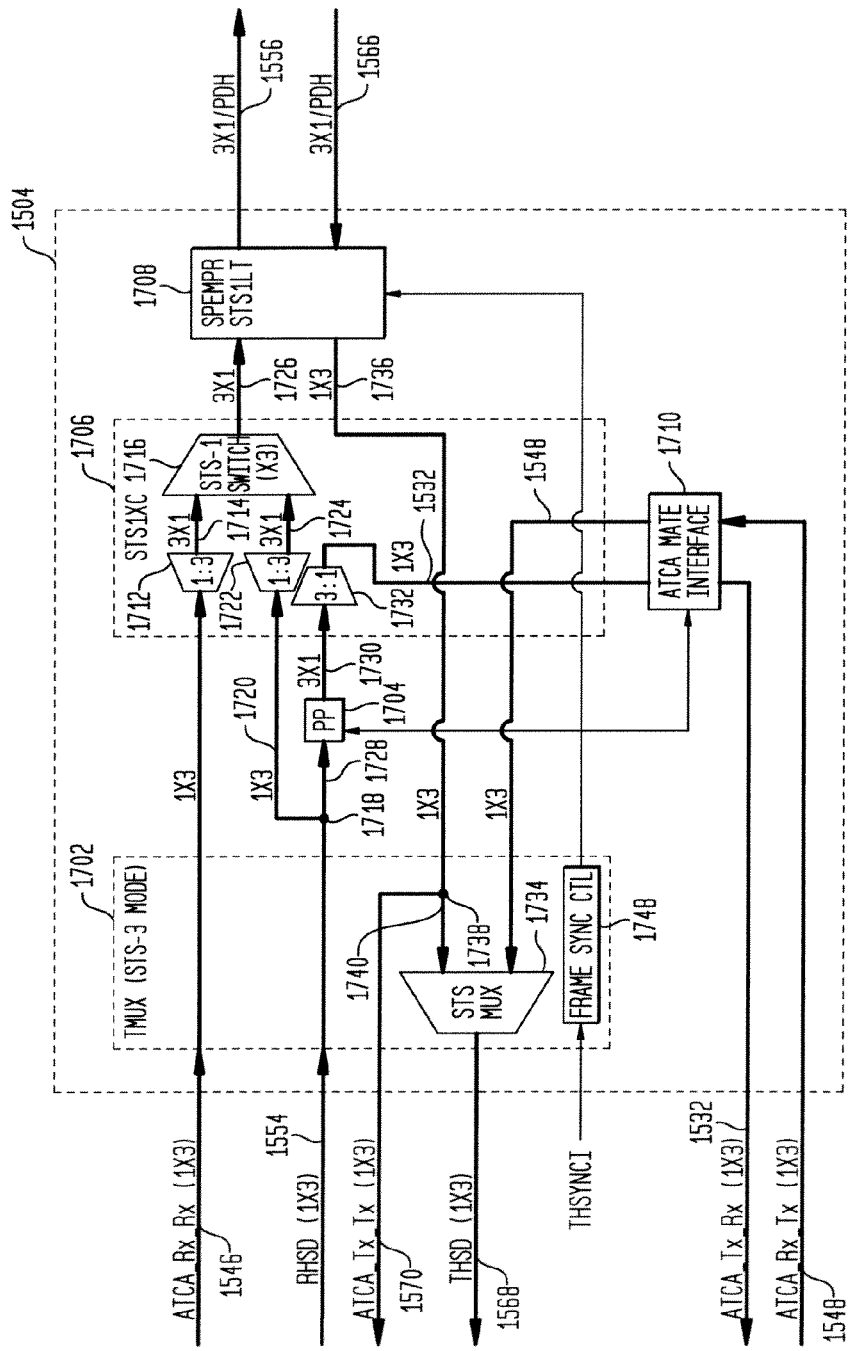
FIG. 17 is a block diagram of slave FMM device 1504 in FIG. 15.

FIG. 17 is a block diagram of slave FMM device 1504 in FIG. 15.

In the receive direction, FMM device 1504 receives 1) 1×3 ATCA_Rx_Rx 1546, 2) 1×3 RHSD 1554, and 3) 1×3 ATCA_Rx_Tx signal 1548. TMUX 1702 relays 1×3 ATCA_Rx_Rx signal 1546 to 1:3 demultiplexer 1712 within STS1XC 1706, which outputs 3×1 signal 1714 to three 1×1 switches 1716. TMUX 1702 also relays 1×3 RHSD signal 1554 to bridging node 1718, which sends copy 1720 of RHSD signal 1554 to 1:3 demultiplexer 1722 in STS1XC 1706. Demultiplexor 1722 outputs 3×1 signal 1724 to three 1×1 switches 1716 in STS1XC 1706. Switches 1716 select, on an 1×1 basis, between ATCA_Rx_Rx signal 1714 and RHSD signal 1724, and send the selected 3×1 signal 1726 to SPEMPR/STS1LT 1708 which de-maps/de-multiplexes those signals and outputs at most a 1×3 of payload 1556.

TMUX 1702 includes a frame sync control circuit 1748, in a similar manner to the sync generation circuit 2000 of FIG. 13 and discussed below in conjunction with FIG. 20 (e.g., control circuit 1748 creates an internal synchronization based on counters). As shown in FIG. 17, the exemplary frame sync control circuit 1748 is not free running, as it is based on input signal THSYNCI. The output of the frame sync control circuit 1748 is used to synchronize pointer processor 1704, ATCA Mate Interface 1710 and SPEMPR/STS1LT 1708 (discussed below).

Bridging node 1718 also sends a second copy 1728 of RHSD signal 1554 to Pointer Processor 1704, which processes and demultiplexes signal 1728 and sends the resulting 3×1 signal 1732 to 3:1 multiplexor 1732 in STS1XC 1706. Multiplexor 1732 outputs 1×3 signal 1532 to ATCA Mate Interface 1710. ATCA Mate Interface 1710 relays 1×3 ATCA_Tx_Rx signal 1532 to master FMM device 1502 of FIG. 15.

ATCA Mate Interface 1710 receives 1×3 ATCA_Rx_Tx signal 1548 and sends that signal to STS multiplexor 1734 in TMUX 1702.

In the transmit direction, SPEMPR/STS1LT 1708 receives at most a 1×3 of payload 1566, maps/multiplexes that payload into a 1×3 signal 1736 and sends that signal to bridging node 1738 in TMUX 1702 via STS1XC 1706. Bridging node 1738 makes a copy 1570 of THSD signal 1736 which is sent to master FMM device 1502 of FIG. 15 as ATCA_Tx_Tx signal 1570. Bridging node 1738 sends a second copy 1740 of signal 1736 to STS mux 1734 in TMUX 1702. STS mux 1734 comprises the following elements not shown on FIG. 17: 1) two 1:3 demultiplexors to demultiplex 1×3 THSD signal 1740 and 1×3 ATCA_Rx_Tx signal 1548; 2) three 1×1 switches to select, on an 1×1 basis, between signal 1740 and ATCA_Rx_Tx signal 1548; and 3) a 3:1 multiplexor which multiplexes the selected 1×1 signals into a 1×3 THSD 1568 which is then sent to master FMM device 1502 of FIG. 15.

In four-device quad-OC-3 configuration, 1+1 and equipment protection operates in the following manner. For master FMM device 1502 of FIG. 15, if the quality of one or more of the 1×1 signals contained within working 1×3 RHSD signal 1522/1536 degrades below a defined threshold, then the corresponding switches 1612 in STS1XC 1508 will switch from the degraded 1×1 signal(s) to protection 1×1 signal(s) in 1×3 ATCA_Rx_Rx signal 1620. Likewise, if the quality of one or more of the 1×1 signals contained within working 1×3 THSD signal 1576 degrades below a defined threshold, then the corresponding switches 1552 inside TMUX 1506 will switch from the degraded 1×2 signal(s) to protection 1×1 signal(s) within 1×3 ATCA_Rx_Tx signal 1550.

For slave FMM device 1504 of FIG. 17, if the quality of one or more of the 1×1 signals contained within working 1×3 RHSD signal 1720 degrades below a defined threshold, then the corresponding switches 1716 will switch from the degraded 1×1 signal(s) to protection 1×1 signal(s) within 1×3 ATCA_Rx_Rx signal 1714. Likewise, if the quality of one or more of the 1×1 signals contained within working 1×3 THSD 1740 in FIG. 17 degrades below a defined threshold, then the corresponding switches 1734 inside TMUX 1702 will switch from the degraded 1×1 signal(s) to protection STS-1 signal(s) within 1×3 ATCA_Rx_Tx signal 1548.

Receive-signal degradation can occur as a result of problems with the connection (1+1 protection) or problems with the FMM devices themselves (equipment protection). Thus, if a working receive signal fails due to a backhoe cutting the optical fiber than carries the signals, or it fails because the transmitting far-end working FMM device itself has failed, the recovery mechanism is the same. Namely, switches 1716 in the working FMM device switch from working to protection receive signals.

Figure 18:
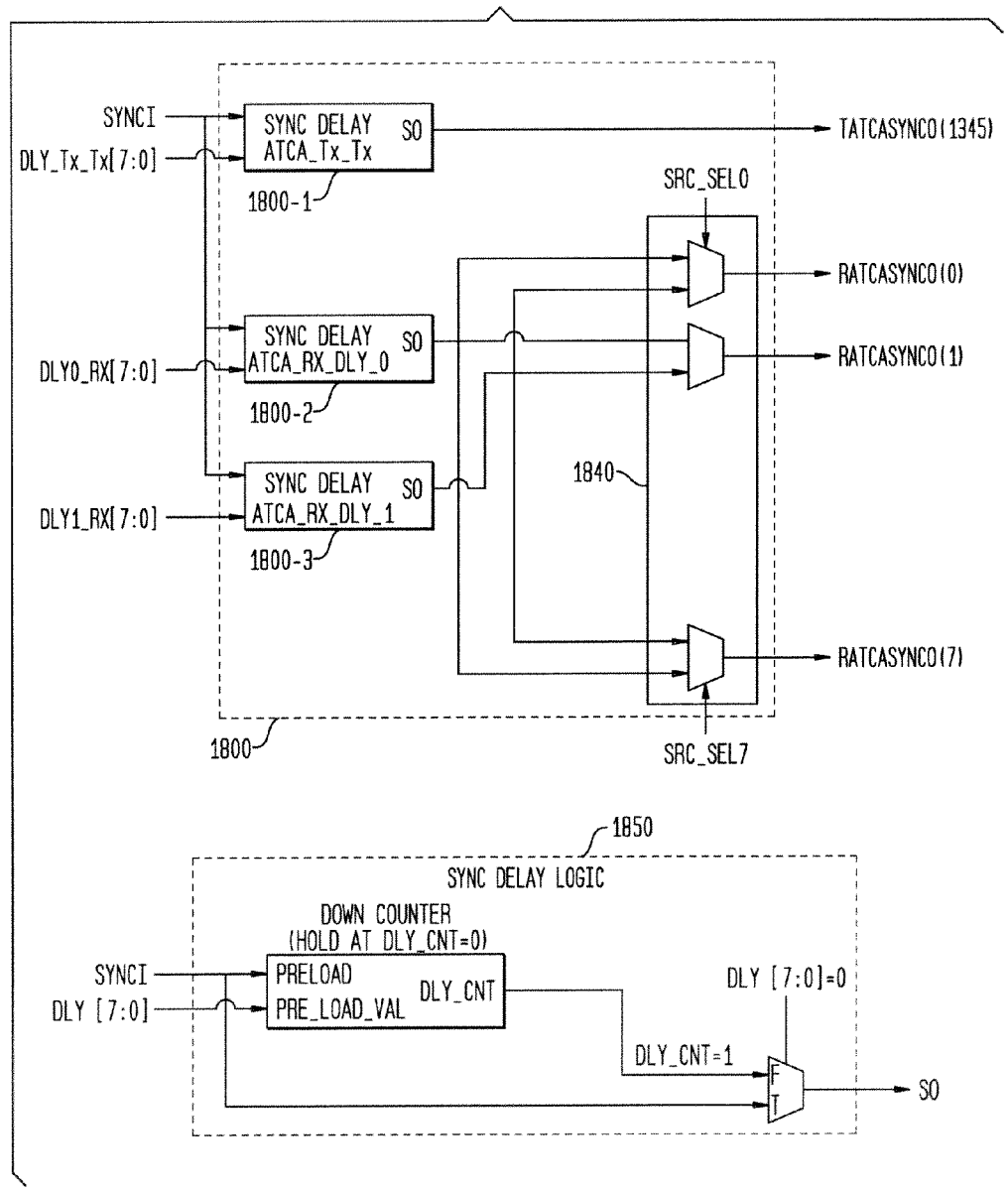
FIG. 18 is a schematic block diagram of the three sync generation circuits of FIG. 13.

FIG. 18 is a schematic block diagram of the three sync generation circuits 1800-1 through 1800-3, discussed above in conjunction with FIG. 13. As shown in FIG. 18, each generation circuit 1800-1 through 1800-3 may be implemented using the exemplary logic 1850. Each generation circuit 1800-1 through 1800-3 receives a synchronization signal SYNCI and generates a delayed version therefrom, based on an applied delay signal, DLY. The delay signal, DLY, is an eight bit value that delays the pulse within the first 255 cycles of the synchronization frame (e.g., one pulse per frame near the beginning of the frame). The generation circuit 1800-1 generates the synchronization signal 1345 shown in FIG. 13. The generation circuits 1800-2 and 1800-3 each generate a respective delayed signal and a set of eight multiplexers 1840 each select one of the delayed signals for use as the four Rx_Rx Syncs 1325 and the four Rx_Tx Syncs 1331, shown in FIGS. 12 and 13.

In this manner, the delay can be selected on an STS-3 basis, based on where the output signal is going (each of the eight sync signals can independently select one of the two available delayed versions).

Figure 19:
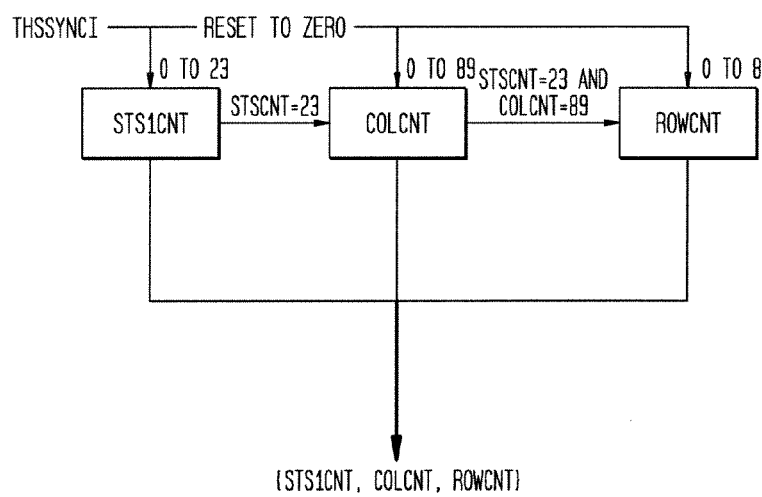
FIG. 19 is a schematic block diagram of the frame control circuit of FIG. 12.

FIG. 19 is a schematic block diagram of the frame control circuit 1299, discussed above in conjunction with FIG. 12. As shown in FIG. 19, the frame control circuit 1299 provides a row/column count for the various fields in each frame. Generally, the frame control circuit 1299 generates the count values that are used to insert the overhead fields in the overhead data. For example, the count can be used to identify the appropriate position for the A1 byte and other overhead bytes. The counters are reset by the frame synchronization.

Figure 20:
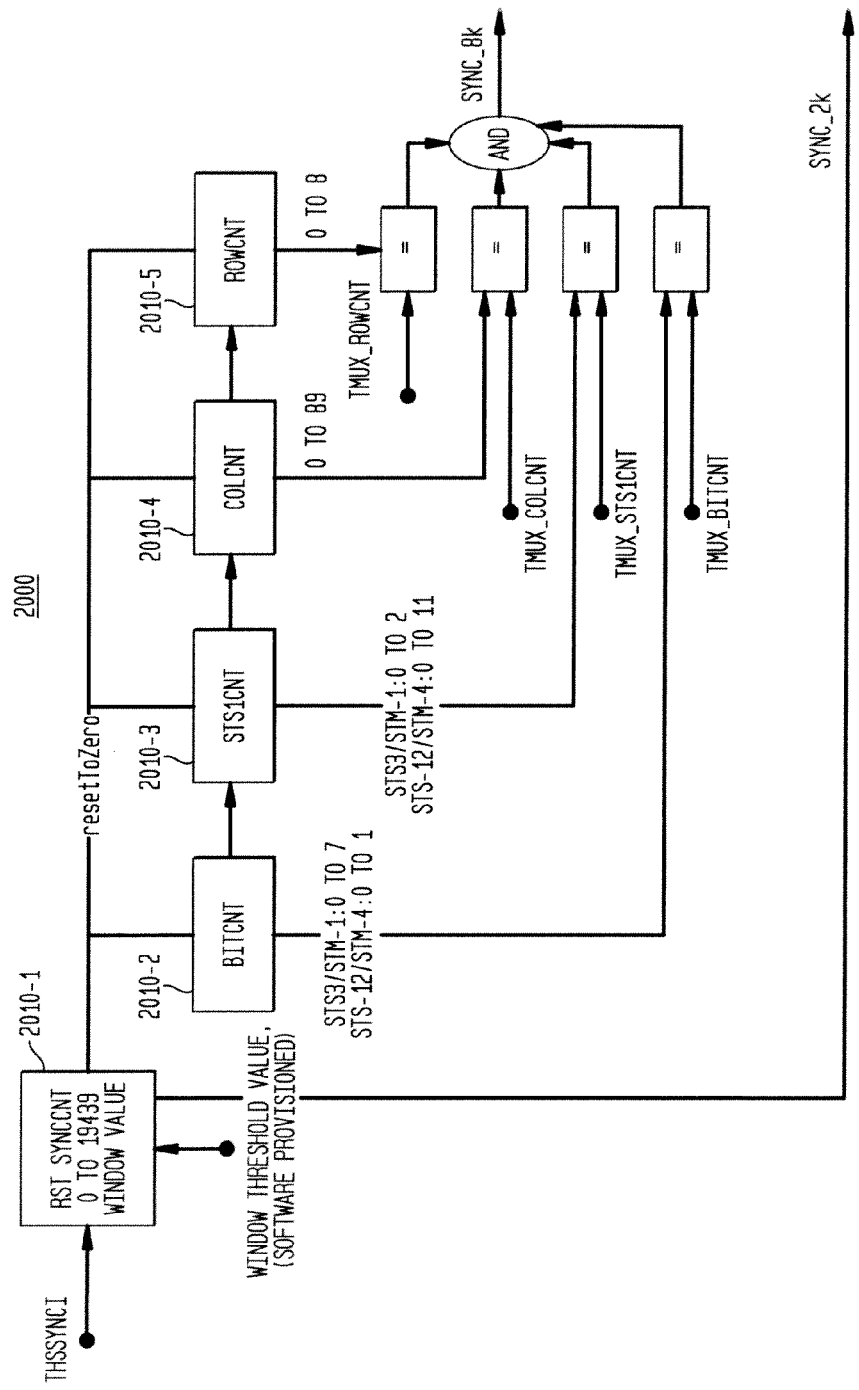
FIG. 20 is a schematic diagram of a sync generation circuit of FIG. 13.

FIG. 20 is a schematic diagram of a sync generation circuit 2000, discussed above in conjunction with FIG. 13. Generally, the sync generation circuit 2000 generates a free running clock signal using a programmable set of registers to achieve the pre-shifting of the present invention, whereby the signals are synchronized early, so that they just have to be delayed at the receiver to achieve the desired alignment. As shown in FIG. 20, the sync generation circuit 2000 includes a plurality of free running counters 2010-1 through 2010-5. In the exemplary embodiment, the TMUX values are software provisioned. Generally, these TMUX values determine the location of the output A1 byte in relation to the THSSYNCI input. When the free running frame counters 2010-1 through 2010-5 equal the TMUX value, the sync free signal goes active. The sync_8*k* signal generated by the sync generation circuit 2000 will reset the frame counters in the core logic that generate the outgoing SONET/SDH signal. The sync_2*k* generated by the sync generation circuit 2000 will reset the h4 counter in the core logic.

As previously indicated, the local clock and frame generation control circuitry is implemented in the TMUX for controlling the STS-3, STM-1, STS-12, STM-4 and pseudo STS-24 termination and generation functions. When the TMUX 1308, 1506 is configured as a master device, the transmit high speed frame sync (THSSYNC) is generated internally based on the transmit high speed clock (THSCI) and sent out to synchronize the transmit path of the other connected slave devices. When the TMUX 1308, 1506 is configured as a slave device, it synchronizes to the incoming transmit high speed frame sync (THSSYNC).

FIG. 21A illustrates a timing diagram for the system framing signal (THSSYNC) generated by the master device 1502 for the slave device(s) 1504. THSSYNC is an 8 kHz composite frame sync pulse for STS-3, STM-1, STS-12 or STM-4. As shown in FIG. 21A, THSSYNC contains J0, J1, and V1-1 information. The time delay from any rising edge of a J0 (8 kHz) to the rising edge of the next J0 is 125 µs. The time delay between any two V1-1 (2 kHz) pulses is 500 µs (whether in STS-3 or STS-12 mode).

FIG. 21B illustrates a timing diagram for the system framing signal (THSSYNC) for the slave devices 1504 (that can optionally be created from the framing signal from the master device 1502).

When supplied externally, the 8 kHz THSSYNC may have a 50/50 duty cycle since the signal will only be sampled on the rising edge. In this case, THSSYNC should be synchronous to THSC. Although there are no setup/hold specifications for the THSSYNC input with respect to THSC, THSSYNC needs to be synchronous to the input transmit high-speed clock (THSC). The device looks for the rising edge of THSSYNC to occur regularly in each frame within a window. A clock derived from THSC samples the incoming frame sync. If THSSYNC is not synchronous to THSC, over time, the rising edge of THSSYNC will fall outside the window causing an STS-N/STM-N level LOF.

Figure 22:
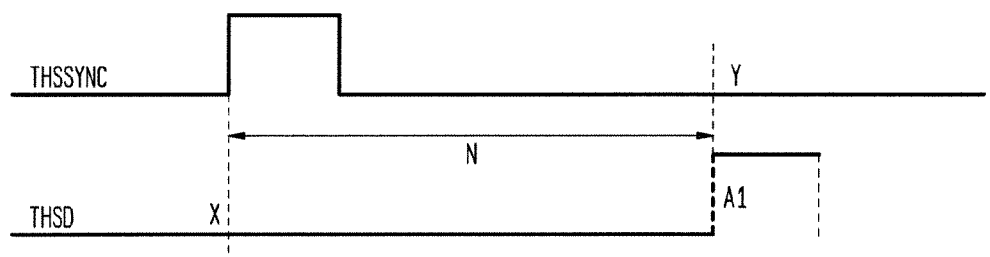
FIG. 22 depicts the relationship between the rising edge of the input THSSYNC (when the device is in slave mode) and the beginning of the SONET frame output on THSD.

FIG. 22 depicts the relationship between the rising edge of the input THSSYNC (when the device is in slave mode) and the beginning of the SONET/SDH frame output on THSD. The delay between THSSYNC and the start of the outgoing SONET/SDH frame is contributed to internal device delays (pertaining to multiplexing functionality, FIFO, and parallel to serial conversion).

Returning to FIG. 20, the registers TMUX_BITCNT[2:0], TMUX_STSCNT[3:0], TMUX_COLCNT[6:0] and TMUX_ROWCNT[3:0] are used in combination to adjust the outgoing STS-N frames position relative to the rising edge of THSSYNC. As shown in FIG. 22, changing these register values will change the location of point X with relation to point Y. For example, if all the registers are zero, the first bit of the first STS1's A1 byte will align relative to the rising edge of THSSYNC.

TMUX_STSCNT, TMUX_COLCNT and TMUX_ROWCNT work in conjunction with one another and allow the delay to be incremented across the STS-N row and down the columns. For example, if one constructs three "FOR" loops with TMUX_ROWCNT (0 to 8) on the outer loop, TMUX_COLCNNT (0 to 89) on the next inner loop and TMUX_STSCNT (0 to 2) on the inner most loop, A1 may be provisioned to any delay from THSSYNC. In a master/slave application, this register is used to align the slave output A1 position to the frame position of the master. It accounts for device and board prop delays.

Figure 23:
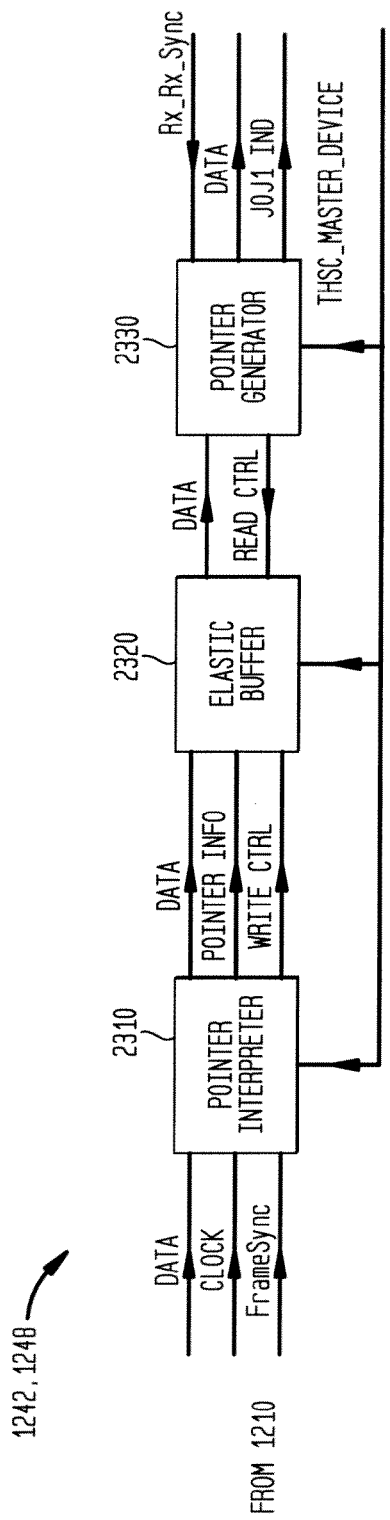
FIG. 23 is a block diagram of the pointer movers in the ATCA block of FIG. 15.

FIG. 23 is a block diagram of the pointer movers 1242, 1248 in the ATCA block 1510. The pointer movers 1242, 1248 map incoming frames to the system framing sync. The point movers 1242, 1248 can handle concatenations inside an STS-3 signal. As shown in FIG. 23, the pointer movers 1242, 1248 comprise a pointer interpreter state machine 2310, an elastic buffer 2320 and a pointer generator 2330.

Figure 24:
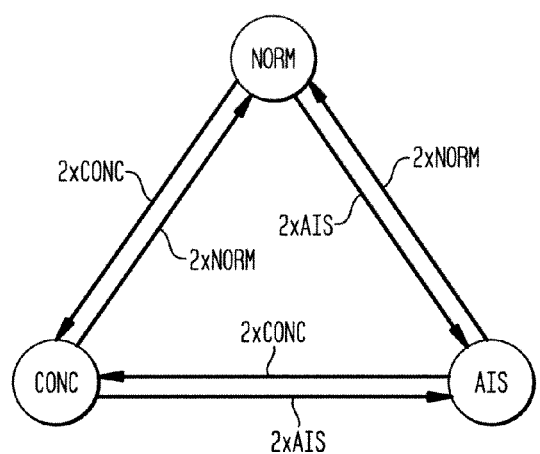
FIG. 24 illustrates the pointer interpreter state machine of FIG. 23.

FIG. 24 illustrates an exemplary pointer interpreter state machine 2310 in further detail. As shown in FIG. 24, the pointer interpreter state machine 2310 has three states (NORM, AIS, and CONC). The pointer interpreter state machine 2310 handles single bit errors without affecting data flow or changing state, but it is not compliant with SONET/SDH standards, since there is no LOP (Loss-of-Pointer) state. The pointer mover 1242, 1248 block can correctly process concatenations inside the STS-3.

As shown in FIG. 24, the NORM State will begin whenever two consecutive NORM pointers are received. If two consecutive NORM pointers are received that both differ from the current offset, then the current offset will be reset to the last received NORM pointer. When the pointer interpreter 2310 changes its offset, it causes the pointer generator 2330 to receive a J1 value in a new position. When the pointer generator 2330 gets an unexpected J1, it resets its offset value to the new location and declares an NDF.

The receipt of two consecutive CONC pointers causes the CONC state to be entered. Once in the CONC state, the offset value from the head of the concatenation chain is used to determine the location of the STS SPE for each STS in the chain.

Two consecutive AIS pointer causes the AIS state to occur. Any two consecutive normal or concatenation pointers will end this state. This state will cause the data leaving the pointer generator to be overwritten with 0xFF.

There is no restriction on how many or how often increments and decrements are processed. Any received increment or decrement is immediately passed to the generator for implementation regardless of when the last pointer adjustment was made. The responsibility for meeting the SONET/SDH criteria for max frequency of pointer adjustments is then left to the upstream pointer processor.

When the interpreter 2310 signals an AIS state, the generator 2330 will immediately begin sending out 0xFF in place of data and H1, H2, and H3. This will continue until the interpreter 2310 returns to NORM or CONC states and a J1 byte is received.

The output frame position of the pointer mover 1242, 1248 is programmable on a per STS-3 basis, in order to align the frames inside the master and slave devices, and frames between master device and slave devices over the ATCA_MATE interface.

Figure 25:
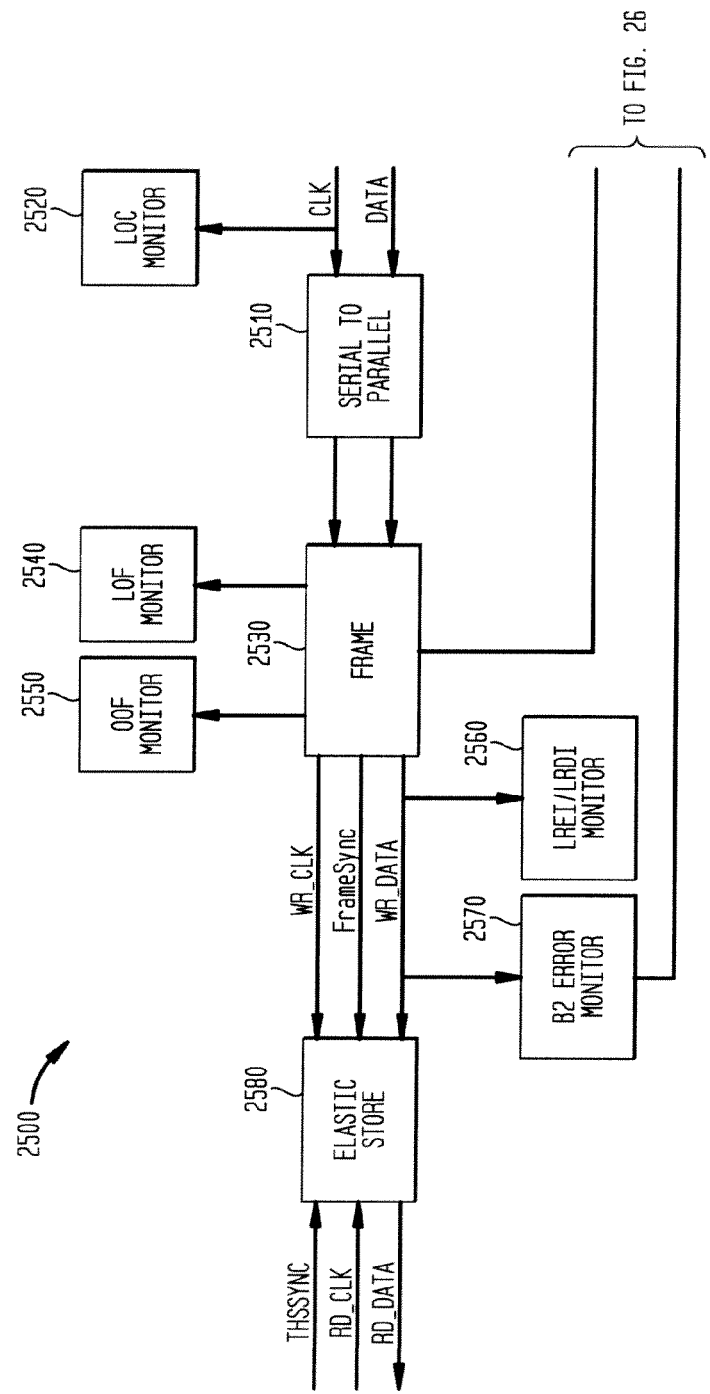
FIGS. 25 and 26 illustrate the receive path and the transmit paths, respectively, for the mate interconnect interface and the ATCA mate interface.
Figure 26:
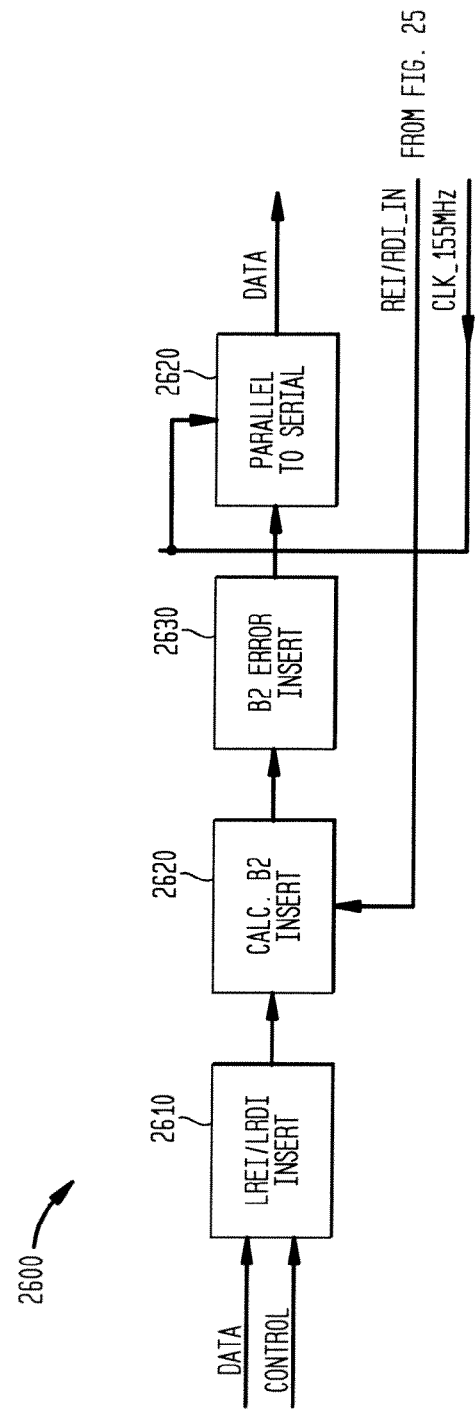

FIGS. 25 and 26 illustrate the receive path 2500 and the transmit paths 2600, respectively, for the mate interconnect interface 1514 and the ATCA mate interface 1518. As indicated above, the mate interconnect interface 1514 and ATCA mate interface 1518 implement the pre-shifting of the present invention, whereby the signals are synchronized early, so that they just have to be delayed at the receiver to achieve alignment.

The receive path 2500 first performs serial to parallel conversion at stage 2510 on the data. The data is next passed through an STS3 framer 2530 which frames the data and generates LOF and OOF signals that are monitored at stages 2540, 2550. Line REI and line RDI is monitored at stage 2560 and B2 is checked at stage 2570 for errors. The total number of B2 errors received are sent out for REI insertion in the mate interconnect interface 1514 transmit block (FIG. 26). RDI is generated depending on OOF, LOF and other programmable error conditions and sent out for RDI insertion in the mate interconnect interface 1514 transmit block.

The framer 2530 generates a frame sync signal when the A1 byte is detected. An elastic buffer 2580 will output the data based on the THSSYNC signal. The frame sync must arrive before the THSSYNC so that the data is there when written.

As shown in FIG. 26, the mate interconnect interface 1514 transmit block gets parallel data from the STS1XC 1508 and inserts line REI and line RDI at stage 2610, computes and inserts B2 and E2 at stages 2620, 2630 and performs parallel to serial conversion at stage 2640 before sending the data. AIS insertion is programmable.

As used in this specification, the term "multiplexor" refers to any suitable device that combines two or more lower-speed input signals to generate a corresponding higher-speed output signal. Similarly, the term "demultiplexor" refers to any suitable device that splits a higher-speed input signal into two or more corresponding lower-speed output signals. Furthermore, the term "switch" refers to any suitable device that generates an output signal by selecting one of two or more input signals.

As used in this specification, a "direct connection" refers to a connection between two modules without any intervening modules, while an "indirect connection" refers to a connection between two modules with one or more intervening modules.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

Signals and corresponding nodes or ports may be referred to by the same name and are interchangeable for purposes here.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A first framer/mapper/multiplexor (FMM) device, comprising:

a protection input port adapted to receive, from a second FMM device, an incoming protection signal corresponding to an incoming high-speed signal received at the second FMM device; and signal-processing circuitry adapted to generate one or more internal signals from said incoming protection signal, wherein said signal-processing circuitry synchronizes said one or more internal signals by changing a phase of said one or more internal signals without changing a frequency of said one or more internal signals based on a desired phase at a destination of each of said one or more internal signals, wherein said destination is a multiplexer that generates an outgoing high-speed signal from one or more switching-level signals, wherein a programmable synchronization signal is transferred from said first FMM device to said second FMM device and wherein a phase of said incoming protection signal is based on said programmable synchronization signal, wherein said first FMM device further comprises a high-speed output port adapted to transmit said outgoing high-speed signal to the high-speed network and wherein said one or more internal signals comprises at least one set of one or more incoming low-speed signals received at the second FMM device.

2. The first FMM device of claim 1, wherein said multiplexer generates said outgoing high-speed signal from switching-level signals corresponding to said at least one set of one or more incoming low-speed signals.

3. The first FMM device of claim 1, wherein said synchronization is based on said programmable synchronization signal.

4. The first FMM device of claim 1, wherein said first FMM device communicates with at least one slave FMM device, and wherein said multiplexer is in an outgoing high-speed signal path of said at least one slave FMM device.

5. The first FMM device of claim 4, wherein said synchronization is based on said programmable synchronization signal generated in said first FMM device.

6. A first framer/mapper/multiplexor (FMM) device, comprising:

a protection input port adapted to receive, from a second FMM device, an incoming protection signal corresponding to an incoming high-speed signal received at the second FMM device; and signal-processing circuitry adapted to generate one or more internal signals from said incoming protection signal, wherein said signal-processing circuitry synchronizes said one or more internal signals by changing a phase of said one or more internal signals without changing a frequency of said one or more internal signals based on a desired phase at a destination of each of said one or more internal signals, wherein said destination is a switch that selects between switching-level signals from the incoming protection signal and switching-level signals from an incoming working signal, wherein a programmable synchronization signal is transferred from said first FMM device to said second FMM device and wherein a phase of said incoming protection signal is based on said programmable synchronization signal, wherein said alignment is based on said programmable synchronization signal.

7. A first framer/mapper/multiplexor (FMM) device, comprising:
- a protection input port adapted to receive, from a second FMM device, an incoming protection signal corresponding to an incoming high-speed signal received at the second FMM device;
- a low-speed input port adapted to receive a first set of one or more incoming low-speed signals from a low-speed network;
- a high-speed output port adapted to transmit an outgoing high-speed signal to a high-speed network; and
- signal-processing circuitry adapted to generate at least one set of one or more switching-level signals from the first set of one or more incoming low-speed signals, wherein said first set of one or more incoming low-speed signals are aligned based on a desired phase at a multiplexer that generates said outgoing high-speed signal from said at least one set of one or more switching-level signals, wherein a programmable synchronization signal is transferred from said first FMM device to said second FMM device and wherein a phase of said incoming protection signal is based on said programmable synchronization signal, wherein said alignment is performed by a frame control module in a mapper device that generates a set of one or more switching-level signals from one or more incoming low-speed signals.

8. The first FMM device of claim 7, wherein said alignment is performed by a frame control module in a mapper device of a slave FMM device, wherein said mapper device generates a set of one or more switching-level signals from one or more incoming low-speed signals.

9. The first FMM device of claim 8, wherein said alignment is based on said programmable synchronization signal generated in said first FMM device.

10. A method performed by a first framer/mapper/multiplexor (FMM) device, comprising:
- receiving, from a second FMM device, an incoming protection signal corresponding to an incoming high-speed signal received at the second FMM device; and
- generating one or more internal signals from said incoming protection signal, wherein said one or more internal signals are synchronized by changing a phase of said one or more internal signals without changing a frequency of said one or more internal signals based on a desired phase at a destination of each of said one or more internal signals, wherein said destination is a multiplexer that generates an outgoing high-speed signal from one or more switching-level signals, wherein a programmable synchronization signal is transferred from said first FMM device to said second FMM device and wherein a phase of said incoming protection signal is based on said programmable synchronization signal, wherein said synchronization is based on said programmable synchronization signal.

11. The method of claim 10, wherein said first FMM device communicates with at least one slave FMM device, and wherein said multiplexer is in an outgoing high-speed signal path of said at least one slave FMM device.

12. The method of claim 11, wherein said synchronization is based on said programmable synchronization signal generated in said first FMM device.

13. The method of claim 10, further comprising the step of generating one or more additional internal signals from said incoming protection signal, wherein said one or more additional internal signals are synchronized by changing a phase of said one or more internal signals without changing a frequency of said one or more internal signals based on a desired phase at a destination of each of said one or more internal signals, wherein said destination is a switch that selects between switching-level signals from the incoming protection signal and switching-level signals from an incoming working signal.

14. A method performed by a first framer/mapper/multiplexor (FMM) device, comprising:
- receiving, from a second FMM device, an incoming protection signal corresponding to an incoming high-speed signal received at the second FMM device;
- receiving a first set of one or more incoming low-speed signals from a low-speed network;
- transmitting an outgoing high-speed signal to a high-speed network; and
- generating at least one set of one or more switching-level signals from the first set of one or more incoming low-speed signals, wherein said first set of one or more incoming low-speed signals are aligned based on a desired phase at a multiplexer that generates said outgoing high-speed signal from said at least one set of one or more switching-level signals, wherein a programmable synchronization signal is transferred from said first FMM device to said second FMM device and wherein a phase of said incoming protection signal is based on said programmable synchronization signal, wherein said alignment is performed by a frame control module in a mapper device that generates a set of one or more switching-level signals from one or more incoming low-speed signals.

15. The method of claim 14, wherein said alignment is performed by a frame control module in a mapper device of a slave FMM device, wherein said mapper device generates a set of one or more switching-level signals from one or more incoming low-speed signals.

* * * * *